US006263337B1

(12) United States Patent
Fayyad et al.

(10) Patent No.: US 6,263,337 B1
(45) Date of Patent: *Jul. 17, 2001

(54) SCALABLE SYSTEM FOR EXPECTATION MAXIMIZATION CLUSTERING OF LARGE DATABASES

(75) Inventors: Usama Fayyad, Mercer Island, WA (US); Paul S. Bradley, Madison, WI (US); Cory Reina, Kirkland, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,906

(22) Filed: May 22, 1998

Related U.S. Application Data

(63) Continuation-in-part of application No. 09/040,219, filed on Mar. 17, 1998.

(51) Int. Cl.[7] .................................................. G06F 17/00
(52) U.S. Cl. ........................................ 707/6; 707/3; 707/4
(58) Field of Search ................................... 707/3, 4, 5, 6, 707/7, 10, 101, 102, 103, 104; 706/12, 45, 53; 382/159, 226, 224, 225, 227, 228; 702/101, 129, 128, 173; 359/178, 174; 705/26, 27, 1

(56) References Cited

U.S. PATENT DOCUMENTS

| 5,329,596 | * | 7/1994 | Sakou et al. | 382/226 |
|---|---|---|---|---|
| 5,832,182 | * | 11/1998 | Zhang et al. | 706/50 |
| 5,832,482 | * | 11/1998 | Yu et al. | 707/6 |
| 5,875,285 | * | 2/1999 | Chang | 706/53 |
| 5,884,305 | * | 3/1999 | Kleinbert et al. | 707/6 |

OTHER PUBLICATIONS

J. Banfield and A. Raftery, "Model–based Gaussian and non–Gaussian Clustering" Biometrics, vol. 49:803–821, pp. 15–34, (1993) C. Bishop, Neural Networks for Pattern Recognition. Oxford University Press. (1995).
P. Cheeseman and J. Stutz, "Bayesian Classification (Auto–Class) Theory and Results", in Advances in Knowledge Discovery and Data Mining, Fayyad, U., G. Piatetsky–Shapiro, P. Smyth, and R. Uthurusaymy (Eds.), pp. 153–180. MIT Press, (1996).

(List continued on next page.)

Primary Examiner—Wayne Amsbury
Assistant Examiner—Thu-Thao Havan
(74) Attorney, Agent, or Firm—Watts, Hoffmann, Fisher & Heinke, Co., L.P.A.

(57) ABSTRACT

In one exemplary embodiment the invention provides a data mining system for use in finding clusters of data items in a database or any other data storage medium. Before the data evaluation begins a choice is made of the number M of models to be explored, and the number of clusters (K) of clusters within each of the M models. The clusters are used in categorizing the data in the database into K different clusters within each model. An initial set of estimates for a data distribution of each model to be explored is provided. Then a portion of the data in the database is read from a storage medium and brought into a rapid access memory buffer whose size is determined by the user or operating system depending on available memory resources. Data contained in the data buffer is used to update the original model data distributions in each of the K clusters over all M models. Some of the data belonging to a cluster is summarized or compressed and stored as a reduced form of the data representing sufficient statistics of the data. More data is accessed from the database and the models are updated. An updated set of parameters for the clusters is determined from the summarized data (sufficient statistics) and the newly acquired data. Stopping criteria are evaluated to determine if further data should be accessed from the database.

34 Claims, 9 Drawing Sheets

OTHER PUBLICATIONS

A.P. Demster, N.M. Laird, and D.B. Rubin, "Maximum Likelihood from Incomplete Data via the EM Algorithm". Journal of the Royal Statistical Society, Series B, 39(1): 1–38, (1977).

D. Fisher. "Knowledge Acquisition via Incremental Conceptual Clustering". Machine Learning, 2:139–172, (1987).

R.M. Neal and G.E. Hinton, "A View of the EM Algorithm that Justifies Incremental,Sparse, and Other Variants", to appear in M.I. Jordan(Ed.), Learning in Graphical Models, Kluwer: (1998).

S.Z. Selim and M.A. Ismail, K–Means–Type Algorithms: A Generalized Convergence Theorem and Characterization of Local Optimality.: IEEE Trans. on Pattern Analysis and Machine Intelligence, vol. PAMI–6, No. 1, (1984).

T. Zhang, R. Ramakrishnan, and M. Livny. "BIRCH: A New Data Clustering Algorithm and Its Applications". Data Mining and Knowledge Discovery 1(2). (1997).

C. M. Bishop. "Neural Networks for Pattern Recognition." *Bayes Theorem.* Clarendon Press.Oxford pp. 17–23 (1995).

C.M. Bishop. "Neural Networks For Pattern Recognition." *The Normal distribution.* Clarendon Press.Oxford. pp. 34–38 (1995).

C.M. Bishop. "Neural Networks For Pattern Recognition." *Maximum Likelihood.* Clarendon Press. Oxford pp. 39–42 (1995).

C.M. Bishop. "Neural Networks For Pattern Recognition." *Density Estimation in General.* Clarendon Press. Oxford pp. 51–55, (1995).

C. M. Bishop. "Neural Networks for Pattern Recognition." Mixture Models/Maximum Likelihood/EM Algorithm. Clarendon Press. Oxford pp. 59–72 (1995).

R. Duda and P. Hart. "Pattern Classification and Scene Analysis." *Bayes Decision Theory.* John Wiley & Sons pp. 10–13.

R. Duda and P. Hart. "Pattern Classification and Scene Analysis." *The Normal Density.* John Wiley & Sons. pp. 22–24 (1973).

R. Duda and P. Hart. "Pattern Classification and Scene Analysis." *Maximum Likelihood Estimation*: John Wiley & Sons pp. 45–49 (1973).

R. Duda and P. Hart. "Pattern Classificationa nd Scene Analysis." *Sufficient Statistics and the Exponential Family.* John Wiley & Sons pp. 62–66 (1973).

R. Duda and P. Hart. "Pattern Classification and Scene Analysis." *Density Estimation.* John Wiley & Sons Chap. 4, pp. 85–88 (1973).

R. Duda and P. Hart. "Pattern Classification and Scene Analysis." *Unsupervised Learning and Clustering.* John Wiley & Sons. Chap. 6 pp. 189–200 (1973).

R. Duda and P. Hart. "Pattern Classification and Scene Analysis." *Clustering Criteria (K–Mean)*: John Wiley & Sons Chap. 6 pp. 217–219 (1973).

R. Duda and P. Hart. "Pattern Classificationa nd Scene Analysis." *Iterative Optimization.* (relates to K–Mean/EM) John Wiley & Sons Chap. 6 pp. 225–228 (1973).

K. Fukunaga. "Statistical Pattern Recognition". *Bayes Theorem Academic Press Chap. 1* pp. 12–13 (1990).

K. Fukanaga. "Statistical Pattern Recognition." *Normal Distributions.* Academic Press. Chap. 2 pp. 16–24 (1990).

K. Fukanaga. "Statistical Pattern Recognition." *Clustering* Academic Press. Chap. 11 pp. 508–512 (1990).

R. Duda and P. Hart. "Pattern Classificationa nd Scene Analysis." *Nearest Mean Reclassification Algorithm (k–Mean)*: Chap. 11 pp. 515–523. Academic Press. (1990).

K. Fukunaga. "Statistical Pattern Recognition". *Maximum Likelihood.* Academic Press Chap. 11 pp. 527–532 (1990).

* cited by examiner

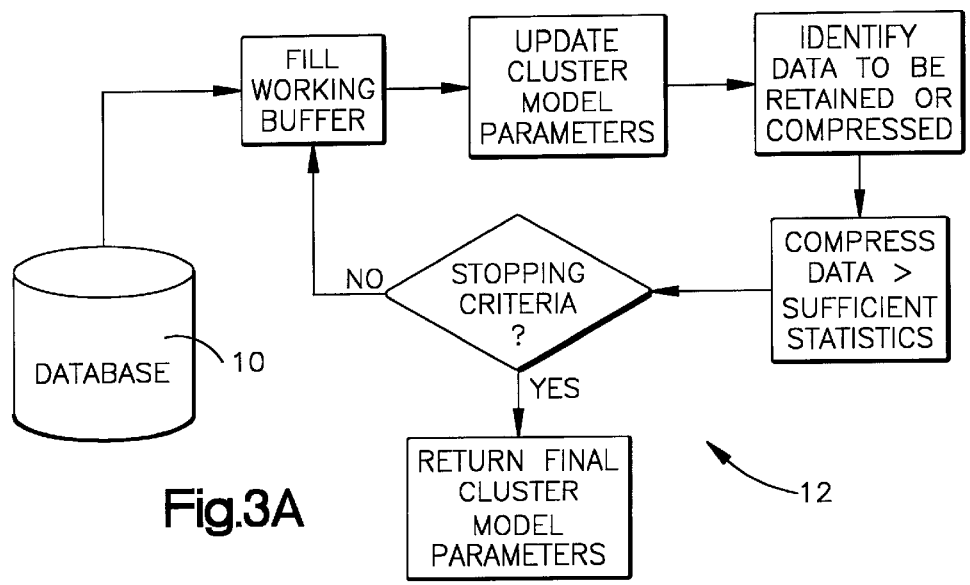
Fig.3A
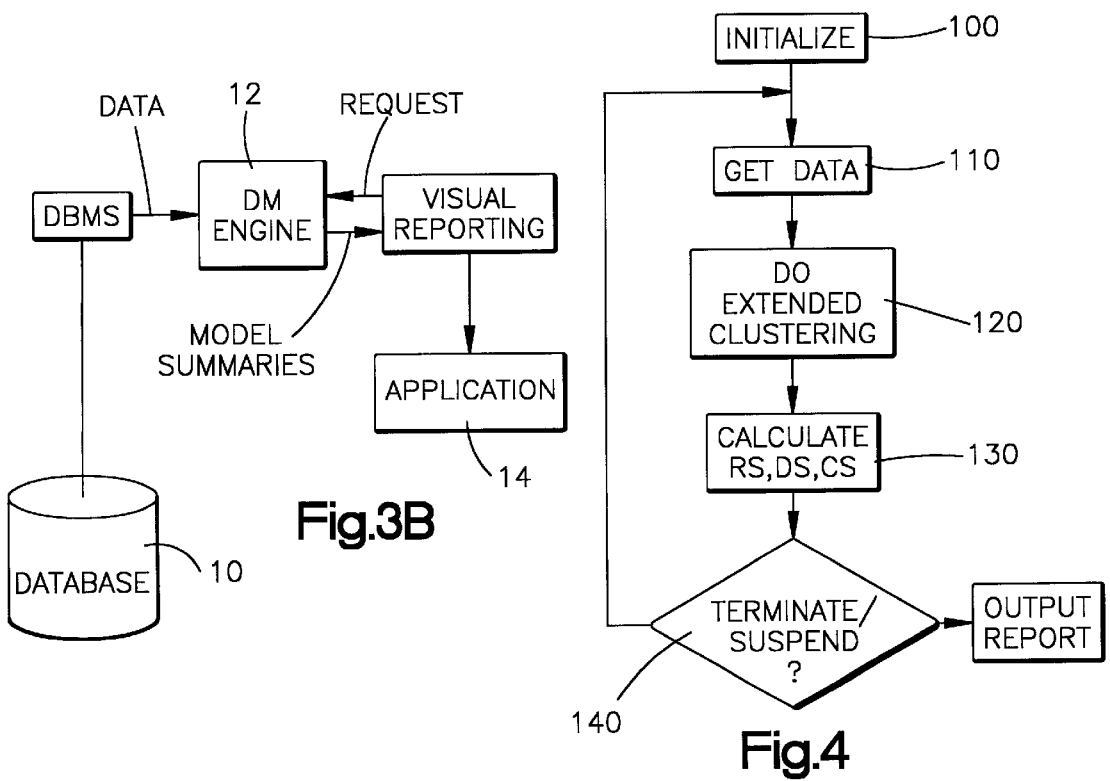
Fig.3B
Fig.4

SCALABLE SYSTEM FOR EXPECTATION MAXIMIZATION CLUSTERING OF LARGE DATABASES

RELATED APPLICATION

The present patent application is a continuation in part of U.S. patent application Ser. No. 09/040,219 to Fayyad et al entitled A Scalable System for Clustering of Large Databases which was filed in the United States Patent and Trademark Office on Mar. 17, 1998. The subject matter of this co-pending application is incorporated herein by reference.

FIELD OF THE INVENTION

The present invention concerns database analysis and more particularly concerns apparatus and method for clustering of data into data sets that characterize the data.

BACKGROUND ART

Large data sets are now commonly used in most business organizations. In fact, so much data has been gathered that asking even a simple question about the data has become a challenge. The modern information revolution is creating huge data stores which, instead of offering increased productivity and new opportunities, are threatening to drown the users in a flood of information. Tapping into large databases for even simple browsing can result in an explosion of irrelevant and unimportant facts. Even people who do not 'own' large databases face the overload problem when accessing databases on the Internet. A large challenge now facing the database community is how to sift through these databases to find useful information.

Existing database management systems (DBMS) perform the steps of reliably storing data and retrieving the data using a data access language, typically SQL. One major use of database technology is to help individuals and organizations make decisions and generate reports based on the data contained in the database.

An important class of problems in the areas of decision support and reporting are clustering (segmentation) problems where one is interested in finding groupings (clusters) in the data. Clustering has been studied for decades in statistics, pattern recognition, machine learning, and many other fields of science and engineering. However, implementations and applications have historically been limited to small data sets with a small number of dimensions.

Each cluster includes records that are more similar to members of the same cluster than they are similar to rest of the data. For example, in a marketing application, a company may want to decide who to target for an ad campaign based on historical data about a set of customers and how they responded to previous campaigns. Other examples of such problems include: fraud detection, credit approval, diagnosis of system problems, diagnosis of manufacturing problems, recognition of event signatures, etc. Employing analysts (statisticians) to build cluster models is expensive, and often not effective for large problems (large data sets with large numbers of fields). Even trained scientists can fail in the quest for reliable clusters when the problem is high-dimensional (i.e. the data has many fields, say more than 20).

A goal of automated analysis of large databases is to extract useful information such as models or predictors from the data stored in the database. One of the primary operations in data mining is clustering (also known as database segmentation). Clustering is a necessary step in the mining of large databases as it represents a means for finding segments of the data that need to be modeled separately. This is an especially important consideration for large databases where a global model of the entire data typically makes no sense as data represents multiple populations that need to be modeled separately. Random sampling cannot help in deciding what the clusters are. Finally, clustering is an essential step if one needs to perform density estimation over the database (i.e. model the probability distribution governing the data source).

Applications of clustering are numerous and include the following broad areas: data mining, data analysis in general, data visualization, sampling, indexing, prediction, and compression. Specific applications in data mining including marketing, fraud detection (in credit cards, banking, and telecommunications), customer retention and churn minimization (in all sorts of services including airlines, telecommunication services, internet services, and web information services in general), direct marketing on the web and live marketing in Electronic Commerce.

The framework we present in this invention satisfies the following Data Mining criteria:

1. Require one scan (or less) of the database if possible: a single data scan is considered costly, early termination if appropriate is highly desirable.

2. On-line "anytime" behavior: a "best" answer is always available from the system, with status information on progress, expected remaining time, etc.

3. Suspendable, stoppable, resumable; incremental progress saved to resuming a stopped job.

4. Ability to incrementally incorporate additional data with existing models efficiently.

5. Work within confines of a given limited RAM buffer

6. Utilize variety of possible scan modes: sequential, index, and sampling scans if available.

7. Ability to operate with forward-only cursor over a view of the database. This is necessary since the database view may be a result of an expensive join query, over a potentially distributed data warehouse, with much processing required to construct each row (case).

SUMMARY OF THE INVENTION

The present invention concerns a process for scaling a known probabilistic clustering algorithm, the EM algorithm (Expectation Maximization) to large databases. The method retains in memory only data points that need to be present in memory. The majority of the data points are summarized into a condensed representation that represents their sufficient statistics. By analyzing a mixture of sufficient statistics and actual data points, the invention achieves much better clustering results than random sampling methods and with dramatically lower memory requirements. The invention allows the clustering process to terminate before scanning all the data in the database, hence gaining a major advantage over other scalable clustering methods that require at a minimum a full data scan.

The technique embodied in our invention relies on the observation that the EM algorithm applied to a mixture of Gaussians does not need to rescan all the data items as it is originally defined and as implemented in popular literature and statistical libraries and analysis packages. The method can be viewed as an intelligent sampling scheme that employs some theoretically justified criteria for deciding which data can be summarized and represented by a significantly compressed set of sufficient statistics, and which data items must be maintained as individual data records in RAM, and hence occupy a valuable resource. On any given iteration of the algorithm, the sampled data is partitioned into three subsets: A discard set (DS), a compression set (CS), and a retained set (RS). For the first two sets, data is discarded but representative sufficient statistics are kept that summarize the subsets. The retained data set RS is kept in memory.

In accordance with an exemplary embodiment of the invention, data clustering is performed by characterizing an initial set of data clusters with a data distribution and obtaining a portion of data from a database stored on a storage medium. This data is then assigned to each of the plurality of data clusters with a weighting factor. The weighting factor assigned to a given data record is used to update the characterization of the data clusters. Some of the data that was accessed from the database is then summarized or compressed based upon a specified criteria to produce sufficient statistics for the data satisfying the specified criteria. The process of gathering data from the database and characterizing the data clusters based on newly sampled data from the database takes place until a stopping criteria has been satisfied.

The invention differs from a clustering system that uses a traditional K-means clustering choice where each data point is assigned to one and only one cluster. In this so called EM process using an expectation maximization process, each data point is assigned to all of the clusters but it is assigned with a weighted factor that normalizes the contributions. These and other objects, advantages and features of the invention will become understood from a review of an exemplary embodiment of the invention which is described in conjunction with the accompanying drawings.

BRIEF DESCRIPTION OF THE DRAWINGS

FIGS. 3A and 3B are schematics of software components of the invention;

FIG. 4 is a flow diagram of an exemplary embodiment of the invention;

FIGS. 8A–8C is a flow chart of an extended EM clustering procedure;

DETAILED DESCRIPTION OF EXEMPLARY EMBODIMENT OF THE INVENTION

The present invention has particular utility for use in characterizing data contained in a database 10 having many records stored on multiple, possibly distributed storage devices. Each record has many attributes or fields which for a representative database might include age, income, number of children, number of cars owned etc. A goal of the invention is to characterize clusters of data in the database 10. This task is straightforward for small databases (all data fits in the memory of a computer for example) having records that have a small number of fields or attributes. The task becomes very difficult, however, for large databases having huge numbers of records with a high dimension of attributes.

The published literature describes the characterization of data clusters using the so-called Expectation-Maximization (EM) analysis procedure. The EM procedure is summarized in an article entitled "Maximum likelihood from incomplete data via the EM algorithm", Journal of the Royal Statistical Society B, vol 39, pp. 1–38 (1977). The EM process estimates the parameters of a model iteratively, starting from an initial estimate. Each iteration consists of an Expectation step, which finds a distribution for unobserved data (the cluster labels), given the known values for the observed data.

Figure 9:
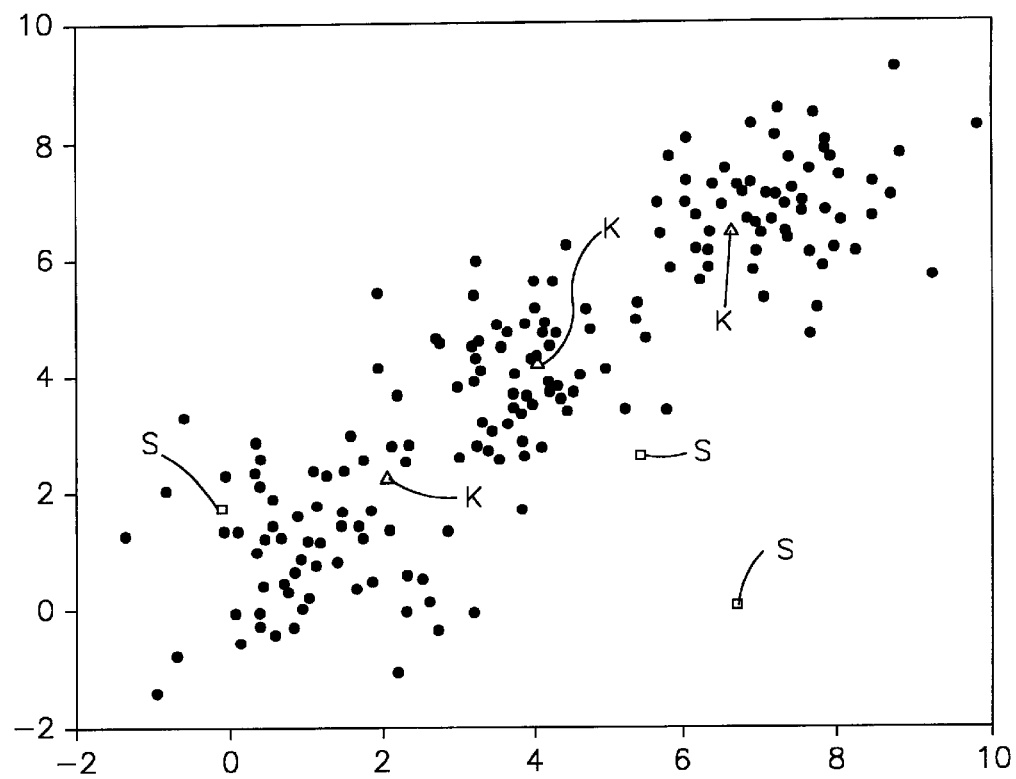
FIG. 9 is a two dimensional depiction of data clusters showing a position of a mean for the data of those clusters.

FIG. 9 is a two dimensional plot showing the position of data points extracted from a database 10. One can visually determine that the data in FIG. 9 is lumped or clustered together. Once a cluster number K is chosen, one can associate data with a given one of these clusters. If one chooses a cluster number of '3' for the data of FIG. 9, one is able to associate a given data item with one of the three clusters (K=3) of the figure. In a so-called K-means clustering technique disclosed in the Fayyad et al patent application referenced previously, the data points belong or are assigned to a single cluster. A process for evaluating a database using the K-means process is describing in our copending United States patent application entitled "A scalable method for K-means clustering of large Databases" filed in the United States Patent and Trademark Office on Mar. 17, 1998, now U.S. Pat. No. 6,012,058, which issued Jan. 4, 2000 and which is assigned to the assignee of the present application and is also incorporated herein by reference.

In an expectation maximization (EM) clustering analysis, rather than assigning each data point in FIG. 9 to a cluster and then calculating the mean or average of that cluster, each data point has a probability or weighting factor for each of the K clusters that characterize the data. For the EM analysis used in conjunction with an exemplary embodiment of the present invention, one associates a Gaussian distribution of data about the centroid of each of the K clusters in FIG. 9.

Figure 5:
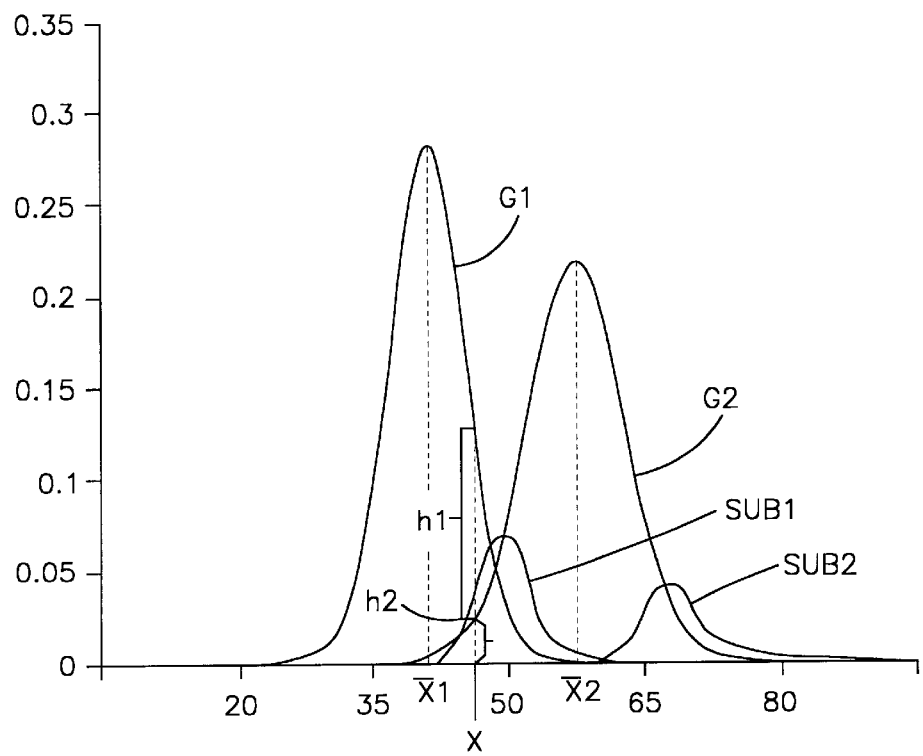
FIG. 5 is a one-dimensional plot of a data distribution of two data clusters illustrating how a data point is assigned to each cluster.

Consider the one dimensional depiction shown in FIG. 5 of two Gaussians G1, G2 representing clusters that have centroids or means of $\bar{x}^1, \bar{x}^2$. The compactness of the data within a cluster is generally indicated by the shape of the Gaussian and the average value of the cluster is given by the mean. Now consider the data point identified along the axis as the point "X." This data point 'belongs' to both the clusters identified by the Gaussians G1, G2. This data point 'belongs' to the Gaussian G2 with a weighting factor proportional to h2 (probability density value) that is given by the vertical distance from the horizontal axis to the curve G2. The data point X 'belongs' to the cluster characterized by the Gaussian G1 with a weighting factor proportional to h1 given by the vertical distance from the horizontal axis to the Gaussian G1. We say that the data point X belongs fractionally to both clusters. The weighting factor of its membership to G1 is given by h1/(h1+h2+Hrest); similarly it belongs to G2 with weight h2/(h1+h2+Hrest). Hrest is the sum of the heights of the curves for all other clusters (Gaussians). If the height in other clusters is negligible one can think of a "fraction" of the case belonging to cluster 1 (represented by G1) while the rest belongs to cluster 2 (represented by G2). For example, if h1=0.13 and h2=0.03, then 0.13/((0.13+0.03)=0.8 of the case belongs to cluster 1, while 0.2 of it belongs to cluster 2. This contrasts with the K-Means model of the copending Fayyad et al application which places the case in exactly one cluster.

In accordance with the present invention, the data from the database 10 is brought into a memory 22 (FIG. 1) and an output model is created from the data by a data mining engine 12. (FIGS. 2, 3A, 3B) In a client/server implementation an application program 14 acts as the client and the data mining engine 12 the server. The application is the recipient of an output model and makes use of that model in one of a number of possible ways such as fraud detection etc.

The model is characterized by an array of pointers, one each for the K clusters of the EM model. Each pointer points to a vector summarizing a mean for each dimension of the data and a second vector indicating the spread of the data. A data structure for the representative or exemplary embodiment of a clustering model produced by the present invention is depicted in FIG. 6D. As the EM model is calculated, some of the recently acquired data that was used to determine the model is compressed. All the data used to model the database is then stored in one of three data subsets. A retained data set (RS) is kept in memory 22 for further use in performing the EM analysis. A discarded data set (DS) and a compressed data set (CS) are summarized in the form of sufficient statistics. The sufficient statistics are retained in memory.

Overview of Scalable EM

FIG. 4 is a flow chart of the process steps performed during a scalable EM analysis of data. An initialization step 100 sets up a number of data structures shown in FIG. 6A–6D and begins with a cluster number K for characterizing the data.

Figure 1:
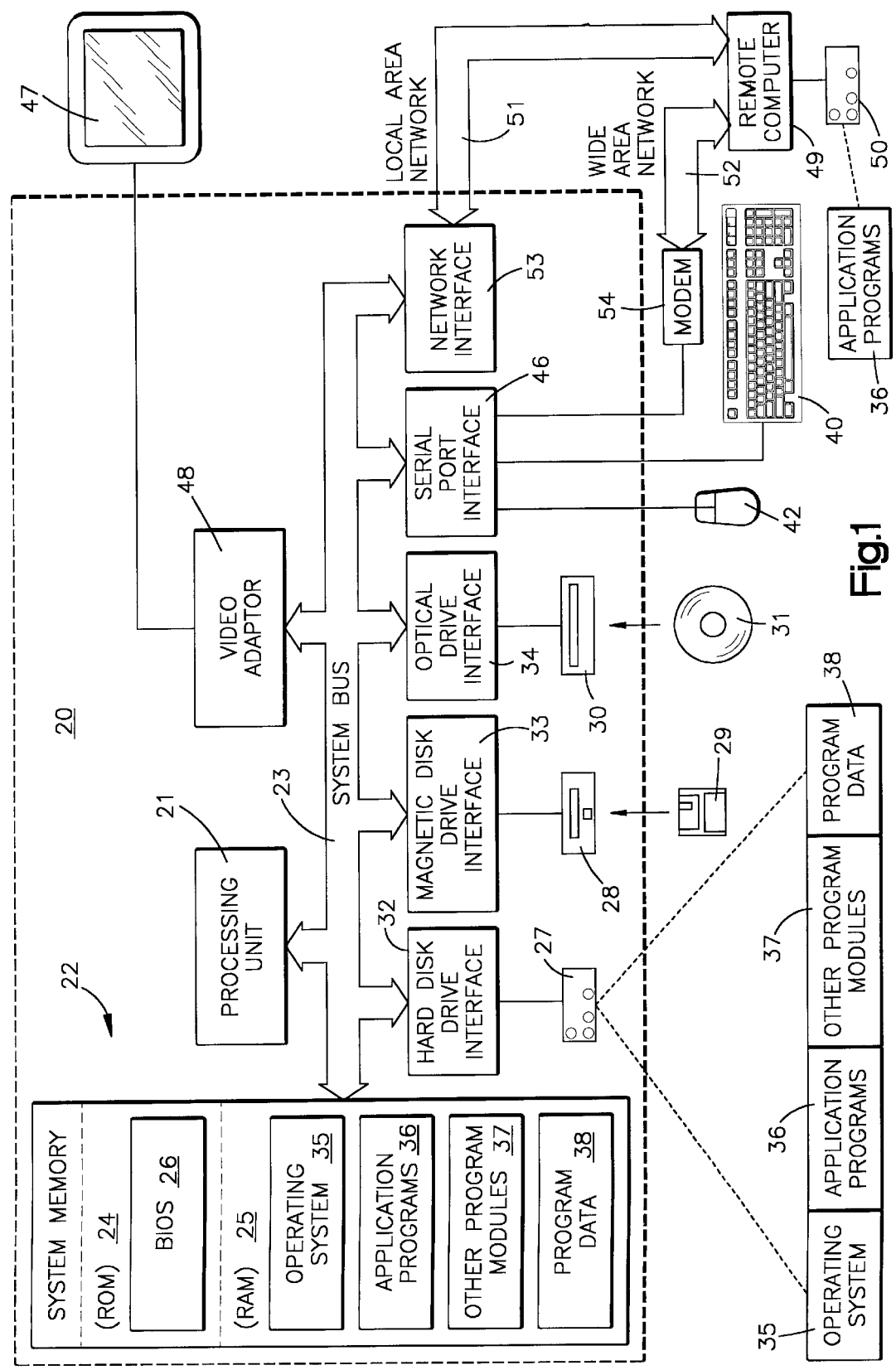
FIG. 1 is a schematic illustration of a computer system for use in practicing the present invention.

A next step 110 is to sample a portion of the data in the database 10 from a storage medium to bring that portion of data within a rapid access memory (into RAM for example, although other forms of rapid access memory are contemplated) of the computer 20 schematically depicted in FIG. 1. In general, the data has a large number of fields so that instead of a single dimension analysis, the invention characterizes a large number of vectors where the dimension of the vector is the number of attributes of the data records in the database. The data structure 180 for this data is shown in FIG. 6C to include a number r of records having a potentially large number of attributes.

The gathering of data can be performed using either a sequential scan that uses only a forward pointer to sequentially traverse the data or an indexed scan that provides a random sampling of data from the database. It is preferable in the index scan that data not be accessed multiple times. This requires a sampling without duplication mechanism for marking data records to avoid duplicates, or a random index generator that does not repeat. In particular, it is most preferable that the first iteration of sampling data be done randomly. If it is known the data is random within the database then sequential scanning is acceptable and will result in best performance as the scan cost is minimized. If it is not known that the data is randomly distributed, then random sampling is needed to avoid an inaccurate representative of the database.

A processor unit 21 of the computer 20 next performs 120 an extended EM analysis of the data in memory. The term 'extended' is used to distinguish the disclosed process from a prior art EM clustering analysis. Classical (prior art) EM clustering operates on data records. The disclosed extended implementation works over a mix of data records and sufficient statistics representing sets of data records. The processor 21 evaluates the data brought into memory and iteratively determines a model of that data for each of the K clusters. A data structure 122 for the results or output model of the extended EM analysis is depicted in FIG. 6D.

In the next step 130 in the FIG. 4 flowchart some of the data used in the present iteration to characterize the K clusters is summarized and compressed. This summarization is contained in the data structures of FIGS. 6A and 6B which take up significantly less storage in memory 25 than the vector data structure needed to store individual records. Storing a summarization of the data in the data structures of FIGS. 6B and 6C frees up more memory allowing additional data to be sampled from the database 10. Additional iterations of the extended EM analysis are performed on this data.

Before looping back to get more data the processor 21 determines 140 whether a stopping criteria has been reached. One stopping criterion that is used is whether the EM analysis is good enough by a standard that is described below. A second alternative stopping criterion has been reached if all the data in the database has been used in the EM analysis. One important aspect of the invention is the fact that instead of stopping the analysis, the analysis can be suspended. Data in the data structures of FIGS. 6A–6D can be saved (either in memory or to disk) and the extended EM process can then be resumed later. This allows the database to be updated and the analysis resumed to update the EM analysis without starting from the beginning. It also allows another process to take control of the processor 21 without losing the state of the EM analysis. Such a suspension could also be initiated in response to a user request that the analysis be suspended by means of a user actuated control on an interface presented to the user on a monitor 47 while the EM analysis is being performed.

FIGS. 10–14 illustrate user interface screens that are depicted on a monitor 47 as data is clustered. These screens are illustrated in the example of the clustering framework described in this invention applied to scaling the K-means algorithm in particular. Scaling other clustering algorithms involves displaying potentially other relevant information concerning the model being constructed. Of course, this affects only display of quantities pertaining to specific model. General notions such as progress bar (302), information like 304, and buffer utilization 334, and 332 are independent of clustering algorithm and do not change with change in clustering algorithm. Turning to FIG. 9, this screen 300 illustrates a clustering process as that clustering takes place. A progress bar 302 indicates what portion of the entire database has been clustered and a text box 304 above the progress bar 302 indicates how many records have been evaluated. In a center portion of the screen 300 two graphs 310, 312 illustrate clustering parameters as a function of iteration number and cluster ID respectively. The first graph 310 illustrates progress of the clustering in terms of iteration number which is displayed in the text box 314. The iteration number refers to the number of data gathering steps that have occurred since clustering was begun. In the FIG. 9 depiction an energy value for the clustering is calculated as defined in Appendix D method 2. As the clustering continues the energy decreases until a stopping criteria has been satisfied. In the graph 310 of FIG. 9 sixteen iterations are depicted.

The second graph 312 at the bottom of the screen is a graph of clustering parameters as a function of cluster number. In the depiction shown there are ten clusters (shown in the text box 316) and the minimum covariance for each of these ten clusters is shown. Covariance is defined from the model data (FIG. 6D) for a given cluster and a given dimension by the relation:

$$SumSq/M - Sum*Sum/M^2$$

A plot of minimum covariance is therefore a plot of the dimension (1 ... n) for a given cluster model having the least or minimum covariance. A drop down list box 320 allows the user to select other indications of covariance. By selecting a maximum for this parameter, a depiction of the dimension of the model having the maximum covariance (FIG. 10) for each of the ten clusters is shown in the bar graph 312. An average covariance bar graph (FIG. 12) indicates the average of the covariance for each cluster over all cluster dimensions. A different user selection via the drop down list box 320 (FIG. 13) shows the weight M for the ten clusters. In a similar manner, a dropdown list box 322 allows different cluster parameters such as model difference (Appendix D, method 1) to be plotted on the graph 310.

A row 326 of command buttons at the bottom of the screen allow a user to control a clustering process. A parameter screen button 330 allows the user to view a variety of clustering parameters on a parameter screen (not shown). By accessing this screen the user can determine for example a maximum number of records or tuples that can be brought into memory to the data set RS in a given iteration. As an example, the user could indicate that this maximum value is 10,000 records.

As outlined above, as the clustering process is performed data is summarized in DS, CS, and stored in RS. If a number of 10,000 records is chosen as the maximum, the system limits the number of new data that can be read based upon the number of subdlusters in the data set CS. Designate the number as ROWSMAX, then the amount of data records that can be currently stored in RS (Rscurrent) is ROWSMAX−2*c where c is the number of subclusters in CS. A progress bar 332 indicates a proportion of data buffers that are currently being used to store RS and CS datasets. This is also depicted as a percentage in a text box 334.

Other parameters that can be modified on the parameter screen are choice of the stopping tolerance, choice of the stopping procedure, choice of parameters for combining subdlusters and adding data points to subclusters, and choice of the compression procedure used to determine DS data set candidates. The parameter screen also allows the user to define where to store the model upon completion of the clustering. If a process is suspended and the model is stored, the user can also use this screen to browse the computer disk storage for different previously stored models.

Current data regarding the dataset CS is depicted in a panel 340 of the screen. Text boxes 342, 344, 346, 348 in this panel indicate a number of subclusters c, and average, minimum and maximum variances for the subdlusters using the above definition of variance. A last text box 350 indicates the average size of the subclusters in terms of data points or tuples in the subdlusters.

Additional command buttons allow the user to interact with the clustering as it occurs. A stop button 360 stops the clustering and stores the results to disk. A continue button 362 allows the process to be suspended and resumed by activating a resume button 364. A generate batch button 366 allows the user to generate a clustering batch file which can be executed as a separate process. Finally a close button 368 closes this window without stopping the clustering.

Data Structures

Data structures used during performance of the extended EM analysis are found in FIGS. 6A–6D. An output or result of the EM analysis is a data structure 122 designated MODEL which includes an array 152 of pointers to a first vector 154 of n elements (floats) designated 'SUM', a second vector 156 of n elements (floats) designated 'SUMSQ', and a single floating point number 158 designated 'M'. The number M represents the number of database records represented by a given cluster. The model includes K entries, one for each cluster.

The vector 'SUM' represents the sum of the weighted contribution of each database record that has been read in from the database. As an example a typical record will have a value of the ith dimension which contributes to each of the K clusters. Therefore the ith dimension of that record contributes a weighted component to each of the K sum vectors. A second vector 'Sumsq' is the sum of the squared components of each record which corresponds to the diagonal elements of the so-called covariance matrix. In a general case the diagonal matrix could be a fall n×n matrix. It is assumed for the disclosed exemplary embodiment that the off diagonal elements are zero. However, this assumption is not necessary and a full covariance matrix may be used. A third component of the model is a floating point number 'M'. The number 'M' is determined by totaling the weighting factor for a given cluster k over all data points and dividing by the number of points. These records constitute the model output from the EM process and given a value somewhat akin to the mean (center) and covariance (spread) of the data in a cluster K.

Figure 6A:
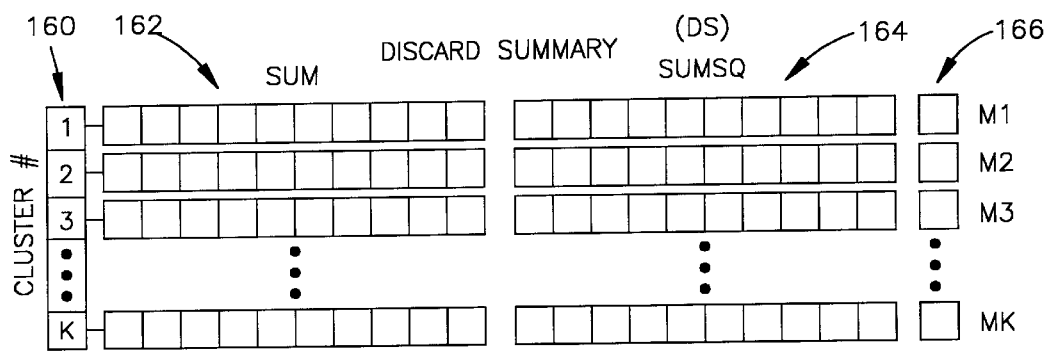
FIGS. 6A–6D are illustrations of data structures utilized for storing data in accordance with the exemplary embodiment of the invention.

An additional data structure designated DS in FIG. 6A includes an array of pointers 160 that point to a group of k vectors (the cluster number) of n elements 162 designated 'SUM' a second group of k vectors 164 designated 'SUMSQ', and a group 166 of k floats designated M. This data structure is similar to the data structure of FIG. 6D that describes the MODEL. It contains sufficient statistics for a number of data records that have been compressed into the data structure shown rather than maintained in memory. Compression of the data into this data structure and the CS data structure described below frees up memory for accessing other data from the database at the step 10 on a next subsequent iteration of the FIG. 4 scalable EM process.

Figure 6B:
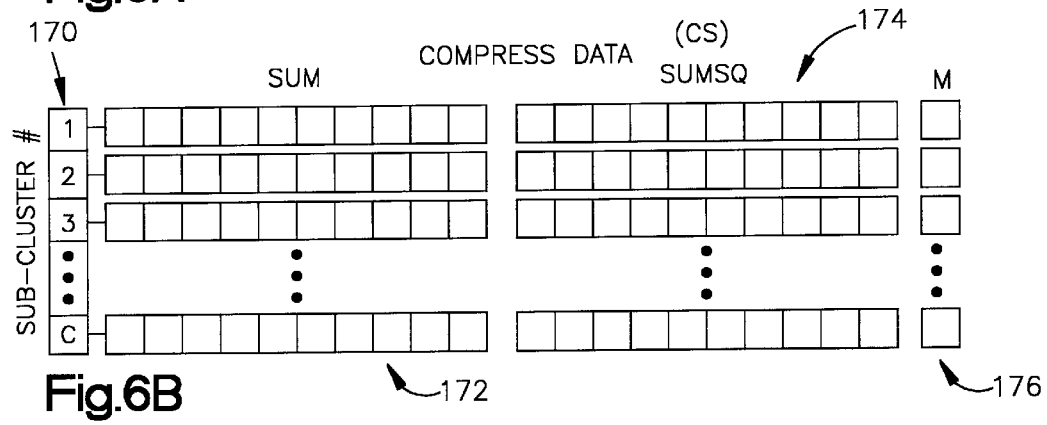
Figure 6C:
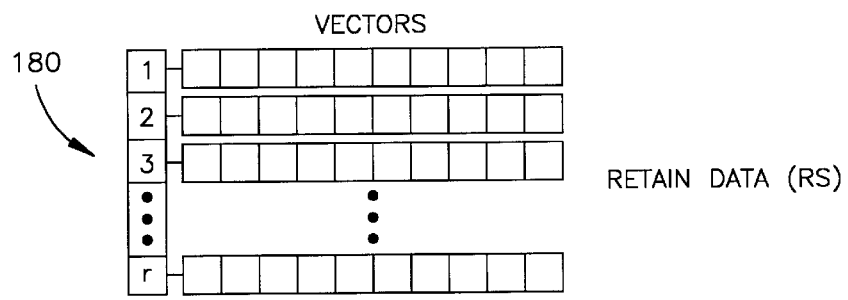
Figure 6D:
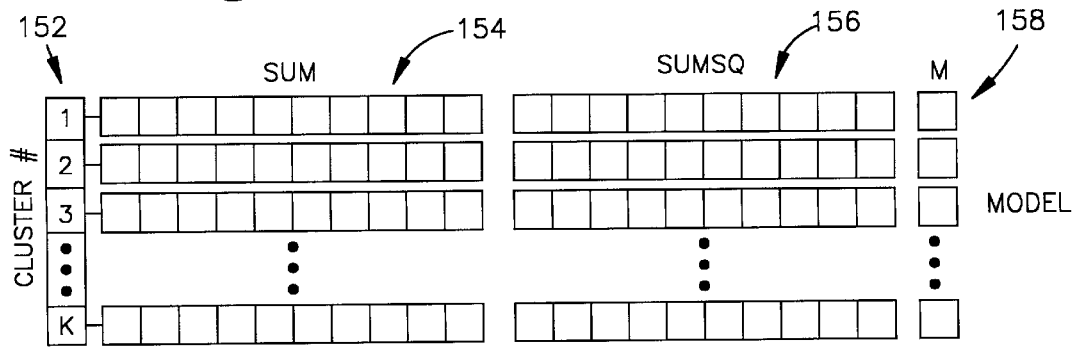

A further data structure designated CS in FIG. 6B is an array of c pointers where each pointer points to an element which consists of a vector of n elements (floats) designated 'SUM', a vector of n elements (floats) designated 'SUMSQ', and a scalar 'M'. The data structure CS also represents multiple data points into a vector similar to the MODEL data structure.

A data structure designated RS (FIG. 6C) is a group of r vectors having n dimensions. Each of the vectors has n elements (floats) representing a singleton data point of the type SDATA. As data is read in from the database at the step 110 it is initially stored in the set RS since this data is not associated with any cluster. The current implementation of the extended EM analysis, RS is a vector of pointers to elements of type SDATA of the same length as the 'SUM' vector of the other data structures and a 'SUMSQ' vector is simply null and M=1.

Table 1 is a list of ten SDATA records which constitute sample data from a database 10 and that are stored as individual vectors in the data structure RS.

TABLE 1

| CaseID | AGE | INCOME | CHILDREN | CARS |
|---|---|---|---|---|
| 1 | 30 | 40 | 2 | 2 |
| 2 | 26 | 21 | 0 | 1 |
| 3 | 18 | 16 | 0 | 1 |
| 4 | 57 | 71 | 3 | 2 |
| 5 | 41 | 73 | 2 | 3 |
| 6 | 67 | 82 | 6 | 3 |
| 7 | 75 | 62 | 4 | 1 |
| 8 | 21 | 23 | 1 | 1 |
| 9 | 45 | 51 | 3 | 2 |
| 10 | 28 | 19 | 0 | 0 |

Figure 8A:
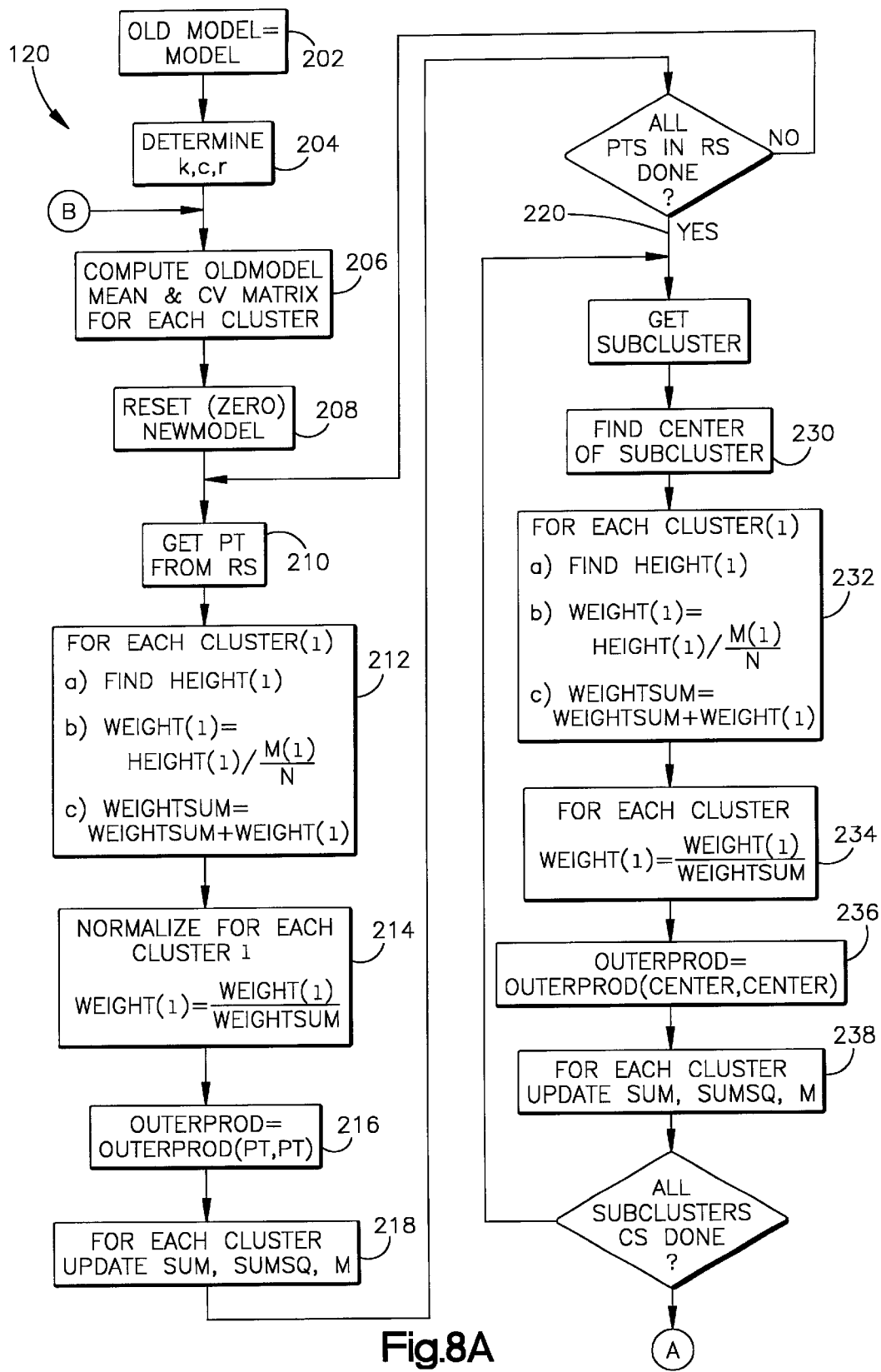
Figure 8B:
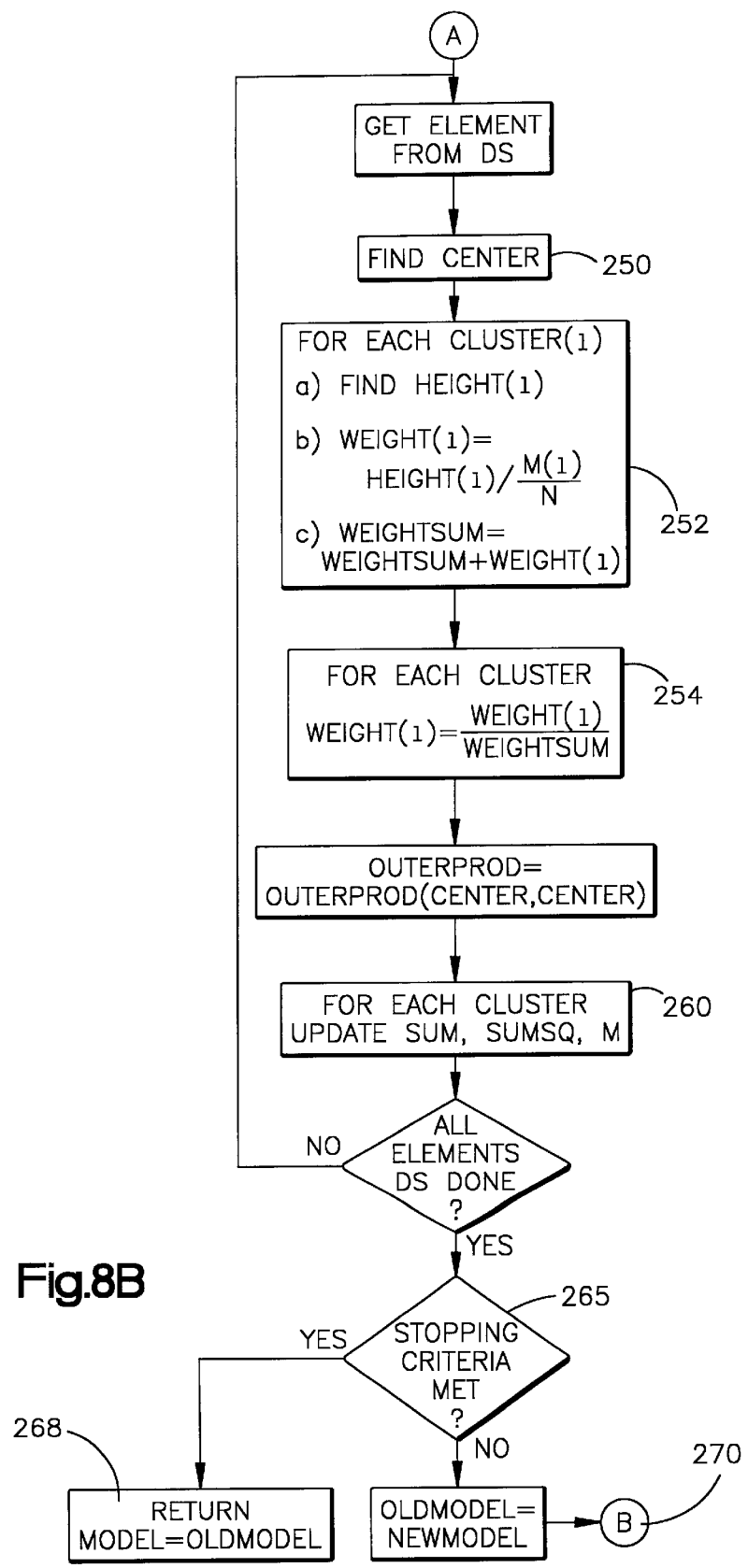

Extended EM Procedure of FIGS. 8A and 8B

An extended EM procedure 120 (FIGS. 8A and 8B) takes the contents of the three data structures RS, DS, CS and data from an existing model stored in the data structure of FIG. 6D and produces a new model. The new model is then stored in place of the old model.

The procedure 120 uses the existing model to create 202 an Old_Model in a data structure like that of FIG. 6D, then determines 204 the length of the pointer arrays of FIGS. 6A–6C and computes 206 means and covariance matrices from the Old_Model SUM, SUMSQ and M data. The set of Old_Model means and covariance matrices are stored as a list of length K where each element of the list includes two parts:

1) a vector of length n (called the "mean") which stores the mean of the corresponding Gaussian or cluster
2) a matrix of size n×n (called the "CVMatrix") which stores the values of a covariance matrix of the corresponding Gaussian or cluster.

The structure holding the means and covariance matrices are referred to below as "Old_SuffStats".

To compute the matrix CVMatrix for a given cluster from the sufficient statistics SUM, SUMSQ and M (in FIG. 6D), the extended EM procedure computes an outer product defined for 2 vectors OUTERPROD(vector1,vector2). The OUTERPROD operation takes 2 vectors of length n and returns their outer product, or the n×n matrix with an entry in row h and column j being vector1(h)*vector2(j). A DETERMINANT function computes the determinant of a matrix. The procedure 200 also uses a function, INVERSE that computes the inverse of a matrix. A further function TRANSPOSE returns the transpose of a vector (i.e. changes a column vector to a row vector). The function EXP(z) computes the exponential $e^z$.

A function 'ConvertSuffStats' calculates 206 the mean and covariance matrix from the sufficient statistics stored in a cluster model (SUM,SUMSQ,M)
[Mean,CVMatrix]=ConvertSuffStats(SUM,SUMSQ,M)
Mean=(1/M)*SUM:
MSq=M*M;
OutProd=OUTERPROD(SUM,SUM);
CVMatrix=(1/MSq)*(M*SUMSQ-3*OutProd);

The data structures of FIG. 6A–6D are initialized 100 before entering the FIG. 4 processing loop. In order for the extended EM procedure 120 to process a first set of data read into the memory, the MODEL data structure of FIG. 6D that is copied into Old_Model is not null. An initial set of cluster means is presented to the process. One procedure is to randomly choose the means and place them in the vector 'Sum' and setting M=1.0. For a clustering number K=2 for the data format from Table 1, assume the SUM vector is given as Table 2 for these two clusters.

TABLE 2

| Cluster # | SUM | | | |
|---|---|---|---|---|
| | AGE | INCOME | CHILDREN | CARS |
| 1 | 55 | 50 | 2.5 | 2 |
| 2 | 30 | 38 | 1.5 | 2 |

Also, arbitrary values are chosen as diagonal members of the starting model's covariance matrices. Each cluster has a covariance matrix associated with it. The diagonal values of the starting matrices are chosen to range in size from 0.8 to 1.2 and are needed to start the process. Initially the float M of each cluster is set to 1.0. For a vector having dimension n=4, the covariance matrix is a 4×4 matrix. Assume cluster number 1 is assigned diagonal entries of the covariance matrix A (Below) yielding a determinant of 0.9504:

| A | | | | $A^{-1}$ | | | |
|---|---|---|---|---|---|---|---|
| .8 | 0.0 | 0.0 | 0.0 | 1.25 | 0.0 | 0.0 | 0.0 |
| 0.0 | 1.2 | 0.0 | 0.0 | 0.0 | .83 | 0.0 | 0.0 |
| 0.0 | 0.0 | 0.9 | 0.0 | 0.0 | 0.0 | 1.1 | 0.0 |
| 0.0 | 0.0 | 0.0 | 1.1 | 0.0 | 0.0 | 0.0 | 0.9 |

Note the off diagonal elements are assumed to be zero. These facilitates the process of determining the inverse matrix $A^{-1}$ as well as the determinant. In a similar fashion the matrix for cluster 2 is designated as B and has a determinant of 0.8448:

| B | | | | $B^{-1}$ | | | |
|---|---|---|---|---|---|---|---|
| 1.0 | 0.0 | 0.0 | 0.0 | 1.0 | 0.0 | 0.0 | 0.0 |
| 0.0 | 1.05 | 0.0 | 0.0 | 0.0 | .95 | 0.0 | 0.0 |
| 0.0 | 0.0 | .85 | 0.0 | 0.0 | 0.0 | 1.18 | 0.0 |
| 0.0 | 0.0 | 0.0 | .95 | 0.0 | 0.0 | 0.0 | 1.05 |

A function designated 'GAUSSIAN' defined below is used at a step 212 (FIG. 8A) to compute the height of the Gaussian curve above a given data point, where the Gaussian has mean=Mean and covariance matrix=CVMatrix.
[height]=GAUSSIAN(x,Mean,CVMatrix)
normalizing_constant=(2*PI)^(n/2)*SQRT(DET(CVMatrix));
CVMatrixInv=INVERSE(CVMatrix);
Height=(1/normalizing_constant)*exp(-(½)*(TRANSPOSE(x-Mean))*CVMatrixInv*(x-Mean));
Note, mathematically, the value of GAUSSIAN for a given cluster for the datapoint x is:

$$height = \frac{1}{(2\pi)^{n/2}\sqrt{|CVMatrix|}} \cdot \exp\left(-\frac{1}{2}(x-\text{Mean})^T (CV\text{Matrix})^{-1}(x-\text{Mean})\right)$$

After resetting 208 a New_Model data structure (similar to FIG. 6D) to all zeros, each point of the RS data structure is accessed 210 and used to update the New_Model. A contribution is determined for each of the data points in RS by determining the weight of each point under the old model. A weight vector has k elements weight(1), weight(2), ... weight(k) where each element indicates the normalized or fractional assignment of the data point to the corresponding cluster. Recall that each data record contributes to all of the K clusters that were set up during initialization. The mean and co-variant matrix structures allow a height contribution for each record (for j=1, . . . , r) to be determined at step 212 of the extended EM procedure 120 for each cluster (for l=1, . . . , k). This height contribution is then scaled to form a weight contribution that takes into account a factor $M_1/N$ where N is the total number of data records read thus far from the database.

Normalizing the weight factor is performed at a step 214 of the procedure. This step is performed by a procedure (referenced below) called UpdateModel(New_Model, DataPoint,vWeight) At a step 216 an outer product is calculated for the relevant vector data point in RS. An update step 218 loops through all k clusters and update the new model data structure by adding the contribution for each data point:

```
for l = 1, . . . ,k
    New_Model(1).SUM = New_Model(1).sum +
                      vWeight(1)*center;
    New_Model(1).SUMSQ = New_Model(1).SUMSQ +
                        vWeight(1)*OuterProd;
    New_Model(1).M_1 = New_Model(1).M_1 + vWeight(1);
End for
```

Consider the ten records of table 1. The fourth record has attributes of Age=45, Income=71 k, Children=3, and Cars=2.

Figure 7:
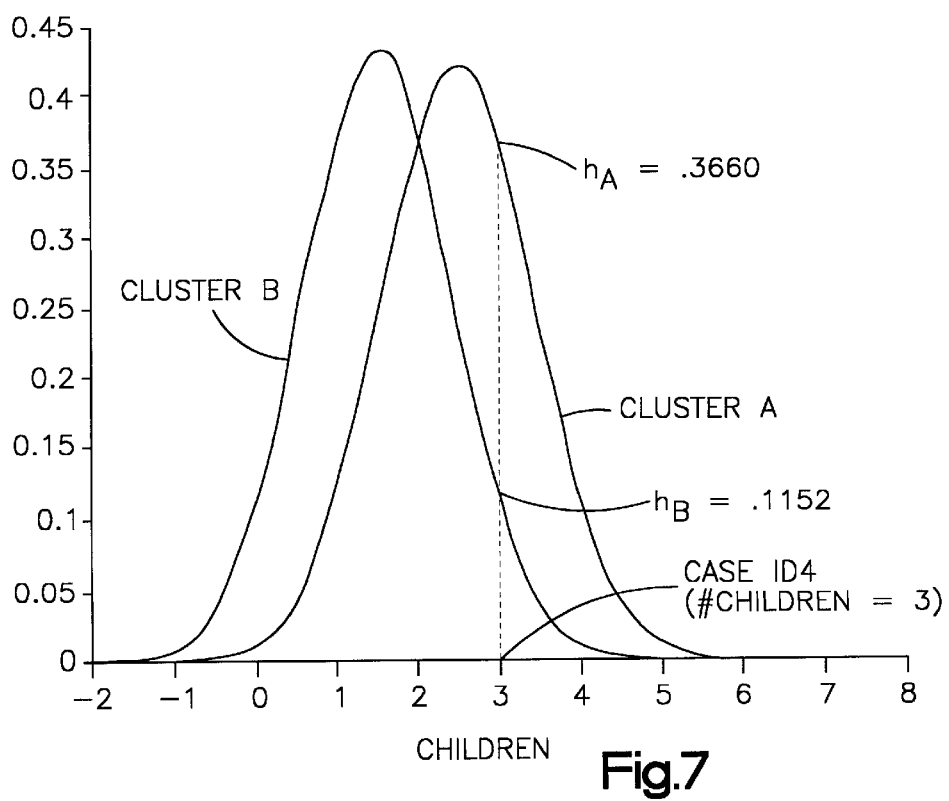
FIG. 7 is a plot of two data clusters that illustrates a contribution to those clusters from data points extracted from a database.

FIG. 7 is a graph depicting the two clusters for the 'children' attribute for clusters A and B corresponding to the covariance matrices A and B summarized above. The mean for cluster B is 1.5 and the standard deviation is 0.9220= sqrt(0.85). For cluster A the mean is 2.5 and the standard deviation is 0.9487=sqrt(0.9). Note CaseId 4 has a value of children=3. This data point has a height of 0.1152 under Gaussian B and a height of 0.3660 under Gaussian A. The weighting factor for this point is therefor with respect to Gaussian A (0.3360)/(0.1152+0.3360)=0.7606. One can assign 23.94% of CaseId No. 4 to cluster B and 76.06% of CaseId No. 4 to cluster A. The normalizing factor for computing the heights is 0.026.

The process of updating the sufficient statistics for the New_Model continues for all points in the RS data structure. On the first pass through the procedure, the data structures DS and CS are null and the RS structure is made up of data read from the database. Typically a portion of the main memory of the computer 20 (FIG. 1) is allocated for the storage of the data records in the RS structure. On a later iteration of the processing loop of FIG. 4, however, the data structures DS, CS are not null.

Consider the data points in table 1 again. Assume that the two clusters G1 and G2 of FIG. 5 represent two data clusters after a number of iterations for the age attribute of the table 1 data. After multiple data gathering steps the means of the clusters are 39 and 58 yrs respectively.

To free up space for a next iteration of data gathering from the database, some of the data in the structure RS is summarized and stored in one of the two data structures CS or DS. (FIGS. 6A, 6B) To define which data points can be safely summarized or compressed, the invention sets up a Bonferroni confidence interval (CI) which defines a multi-dimensional "box" whose center is the current mean for the K Gaussians defined in the MODEL (FIG. 6D). In one dimension this confidence interval is a span of data both above and below a cluster mean. The confidence interval can be interpreted in the following way: one is confident, to a given level, that the mean of a Gaussian will not lie outside of the CI if it was re-calculated over a different sample of data. A detailed discussion of the determination of the Bonferroni confidence interval is found in Appendix A of this application.

Returning to the data of Table 1, CaseId 4 has an age value of 57 years and CaseId 5 has an age of 41. These values of the age attribute fall within a one dimensional confidence interval of the means and therefore are compressed into the RS data structures for the two clusters wherein CaseId 4 is associated or belongs to the cluster G2 and CaseId 5 is associated or belongs to the cluster G1. In performing this compression on actual data a vector distance over all dimensions of the data is calculated and a confidence interval box is determined.

To identify smaller, "dense" regions on the set of data not compressed into the DS dataset. The following process is adopted. Identify many "candidate" subsets of "dense" data points. Then these "candidates" are filtered to make sure that they satisfy a specified "density" criterion. Two of these so-called subclusters SUB1, SUB2 are shown in FIG. 5. Of the candidates that remain after this filtering procedure, we merge the two nearest candidates. If the resulting merger still satisfies the "density" criterion, we keep merged candidate, otherwise it is discarded. The candidate set is determined by running a classic K-means algorithm on the small number of data points remaining in RS after data points have been compressed into DS. This K-means procedure determines a number of subclusters. The subclusters are then kept and merged if the maximum standard deviation along the coordinate axes is less than a threshold.

Consider the subdluster SUB2. This subcluster is characterized by a Gaussian curve that has its own mean and covariance matrix. The mean appears to be about 67 years which is the same as the age attribute for CaseId no. 6. Enough other records fall within the region of this subcluster to warrant summarization of the data from a multiple number of records within this subcluster SUB2. Other records that cannot be classed in one of the Subdlusters are maintained as individual records in RS. This might be the case for CaseId 3 having an age of 18 which is considerably lower than the mean of cluster G! and is not in close proximity to any identified subcluster..

Returning to FIGS. 8A and 8B, the addition of the two datasets CS and DS mean that on subsequent iterations, after each of the single points has been updated a branch 220 is taken to begin the process of updating the New_Model data structure for all the subclusters in CS. A contribution is determined for each of the data points in CS by determining 230 the weight of each subcluster under the old model. First a center vector for the subcluster is determined 230 from the relation center=(1/CS(j).M)*CS(j). SUM.

A weight vector has K elements weight(1), weight(2), ... weight(k) where each element indicates the normalized or fractional assignment of a given subcluster to a cluster. This weight is determined 232 for each cluster and the weight factor is normalized at a step 234 of the procedure. This step is performed by a procedure (referenced later in this application) called UpdateModel(New_Model, SuffStat, vWeight). Note this function is same as procedure Update-Model introduced above for data points, but this one takes sufficient statistics (CS members, and DS members as its second argument). At a step 236 an outer product is calculated for the relevant vector of the subdluster. An update step 238 for the subcluster of CS loops through all k clusters:

```
for 1 = 1, . . . ,k
    New_Model(1).SUM = New_Model(1).sum + weight(1)*center *
        CS(j).M;
    New_Model(1).SUMSQ =
        New_Model(1).SUMSQ + Weight(1)* OuterTempProd *
        CS(j).M;
    New_Model(1).M_1 = New_Model(1).M_1 + weight(1) *
        CS(j).M;
End for
```

When the contribution of all the subclusters whose sufficient statistics are contained in CS have been used to update the New_Model, a branch 240 is taken to update the New_Model using the contents of the data structure DS. A center for each of the k entries of DS is determined 250 from the relation center=(1/DS(j).M)*DS(j).SUM. A weight of this 'point' is then determined under the Old_Model and the weight is normalized 254. The contributions of each of the subclusters is then added 260 to the sufficient statistics of the New_Model:

An exemplary embodiment of the Procedure UpdateModel (New_Model, SuffStat, vWeight) to work with DS members (sufficient stats):

```
for 1 = 1, . . . ,k
    New_Model(1).SUM = New_Model(1).sum + weight(1)*center *
        DS(j).M;
    New_Model(1).SUMSQ =
        New_Model(1).SUMSQ + Weight(1)*OuterTempProd *
        DS(j).M;
    New_Model(1).M_1 = New_Model(1).M_1 + weight(1) *
        DS(j).M;
End for
```

After the New_Model has been updated at the step 260 for each of the k clusters, the extended EM procedure tests 265 whether a stopping criteria has been met. This test begins with an initialization of two variables CV_dist=0 and mean_dist=0. For each cluster a new co-variance matrix is calculated and a distance from the old mean and the new mean as well as a distance between the new and old covariance matrices is determined. These values are totaled for all the clusters:

```
For 1 = 1, . . . ,k
    [New_Mean, New_CVMatrix] = ConvertSuffStats-
    (New_Model(1).SUM,
                         New_model(1).SUMSQ,
                         New_Model(1).M_1);
    mean_dist = mean_dist + distance(Old_SuffStats-
    (1).Mean,New_mean);
    CVDist = CV_dist + distance(Old_SuffStats-
    (1).CVMatrix, New_CVMatrix);
End for
```

The stopping criteria determines whether the sum of these two numbers is less than a stopping criteria value:

$$((1/(2*k))*mean\_dist+CV\_dist)<stop\_tol$$

If the stopping criteria is met the New_Model becomes the Model and the procedure returns 268. Otherwise the New_Model becomes the old model and the procedure branches 270 back to recalculate another New_model from the then existing sufficient statistics in RS, DS, and CS.

Three more detailed explanations of alternate procedures for computing the elements of the data set DS are presented below. The Third is our preferred embodiment:

First Embodiment of DS Data Set Compression

Let Current_Means denote the set $\{\bar{x}^1, \bar{x}^2, \ldots, \bar{x}^k\}$ and Current_Data denote the set $\{x^1, x^2, \ldots, x^m\}$. Assume that the sets of sufficient statistics DS, CS, RS also keep track of the number of data represented in each. Initially the so called Compress_Set CS is empty.

For each cluster l=1, . . . , k:

Determine the CI interval $L^l, U^l$ on the mean of the l-th Gaussian, by one of the 2 methods discussed in Appendix A, for instance.

For each element in the dataset RS $x^i$, Let $w^i \in R^k$ be the vector of probabilistic assignments of data point $x^i$ to the K Gaussians.

Compute the perturbed centers $\tilde{x}^1, \tilde{x}^2, \ldots \tilde{x}^k$ for perturbed Gaussians by solving:

$$\min_{\tilde{x}^1, \tilde{x}^2, \ldots, \tilde{x}^k} \left\{ -\sum_{l=1}^{k} f(\tilde{x}^l) \log f \,\middle|\, \sum_{l=1}^{k} f(\tilde{x}^l) = 1, L^l \leq \tilde{x}^l \leq U^l, i = 1, \cdots, k \right\}.$$

Let $\tilde{w}^i \in R^k$ be the vector of probabilistic assignments of data point $x^i$ to the K perturbed Gaussians.

If $\|w^i - \tilde{w}^i\| < \tau$, then place $(x^i, w^i)$ in Discard_Set. Remove $x^i$ from Current_Data RS.

Update DS by computing the sufficient statistics from Discard_Set. DS is then computed by determining sufficient statistics of a set of probability distributions "best" fitting the Compress_Set.

Second Embodiment of DS Data Set Compression

In accordance with a second exemplary embodiment of the present invention a certain percentage of points "nearest" to the Current_Means of the K Gaussians is summarized by a set of sufficient statistics. The percentage may be user-defined or adapted from the current state of the clustering and dynamically changing memory requirements, for instance. The process begins by presenting a Mahalanobis distance and showing how it is related to the probability that a particular data point was generated by one of the K Gaussians in the mixture model.

The Mahalanobis distance from a data point x to the mean (center) of a multivariate Gaussian with mean $\bar{x}$ and covariance matrix S is:

$$D(x,\bar{x}) = \sqrt{(x-\bar{x})^T S^{-1}(x-\bar{x})}$$

We note the multivariate data point x and the mean $\bar{x}$ are assumed to be column vectors. The superscript 'T' denotes transpose and the superscript "−1" applied to the matrix S denotes matrix inversion.

The Mahalanobis distance is related to the value of the probability density function p(x), assuming the multivariate Gaussian with mean and covariance matrix specified above:

$$p(x) = \frac{1}{(2\pi)^{n/2} \sqrt{|S|}} \exp\left(-\frac{1}{2}(D(x, \bar{x}))^2\right).$$

Here |S| denotes the determinant of the covariance matrix S. The expression above states that the larger the Mahalanobis distance of a given data point to a cluster center, the less likely it is that the given cluster generated the data point. A given percentage of the newly sampled data points, determined to be most likely as generated by the K clusters, are compressed. The actual percentage of points to compress, denoted by the parameter p may be user-defined or determined based on the current clustering and memory limitations.

Let Current_Means denote the set $\{\overline{x}^1, \overline{x}^2, \ldots, \overline{x}^k\}$ and Current_Data be made up of New_Data, denoted as $\{x^1, x^2, \ldots, x^m\}$ and Old_Data (we are only concerned with compression of New_Data, Old_Data has been compressed on a prior iteration).
Initially Compress_Set=empty
For each cluster l=1, ..., k:
Set New_Data(l) to the be the subset of New_Data that is nearest to current mean $\overline{x}^l$ as measured by the Mahalanobis distance.
Set DS(l) to be the set of sufficient statistics representing compression near the current mean $\overline{x}^l$.
Set CS(l) to be the set of sufficient statistics for all subclusters nearest the current mean $\overline{x}^1$ as measured by the Mahalanobis distance.
For each element data point $x^{i,l}$ in New_Data(l), Set $D(x^{i,l}, \overline{x}^l)$ to be the Mahalanobis distance from the data point to the current mean $\overline{x}^l$.
Set $r^l$ to be a threshold on the Mahalanbis distance over each data element in Current_Data(l) so that p percent of the elements of Current_Data(l) have a Mahalanobis distance less than $r^l$ (this operation is easily done by sorting the list of $D(x^{i,l}, \overline{x}^l)$ values).
If $D(x^{i,l}, \overline{x}^l) < r^l$, then add data point $x^{i,l}$ to Discard_Set and remove it from Current_Data.
Update DS by computing the sufficient statistics of SUM and SUMSQ (FIG. 6A) from the Compress_Set. In general, DS is computed by determining sufficient statistics of a set of probability distributions "best" fitting the Discard_Set.
Third Embodiment of DS Data Set Compression In accordance with a third exemplary embodiment of the present invention, a certain percentage of points that are "most likely" under each cluster are moved to the DS set of that cluster. This embodiment is similar to the second, except instead of ranking data by Mahalanobis distance, we rank it by likelihood value. Likelihood is the height of the Gaussian at the data point. The procedure proceeds as follows:
1. For each data point, determine which cluster it is most likely under (which Gaussian has the highest curve at the data point). Call this Temporary Membership.
2. For each cluster, rank its Temporary Members by their likelihood values, then move to DS the top P % of the rank. P is a value specified by the user.
Note that step 2 can be equivalently performed by finding the nearest P % of the temporary members of a cluster when the distance measure is the Mahalanobis Distance introduced above.
Calculate CS Data Structure Assume that the set RS consists of singleton data points and the points compressed by embodiments 1 and 2 above have been removed from the RS dataset and have been summarized in the DS data set. In the one dimensional case described previously this could include, for example, CaseId 4 and CaseId 5. Let m be the number of singleton data elements left in RS.
Set CS_New=empty.
Set k' to be number of subcluster candidate to search for.
Randomly choose k' elements from RS to use as an initial starting point for classic K-means.
Run classic K-means over the data in RS with the initial point. This procedure will determine k' candidate subclusters.
Set up a new data structure CS_New to contain the set of sufficient statistics for the k' candidate subclusters determined in this manner.
For each set of sufficient statistics in CS_New, if the number of data points represented by these sufficient statistics is below a given threshold, remove the set of sufficient statistics from CS_New and leave the data points generating these sufficient statistics in RS. For each set of sufficient statistics in CS_New remaining, if the maximum standard deviation along any dimension of the corresponding candidate subdluster is greater than a threshold β, remove the set of sufficient statistics from CS_New and keep the data points generating these sufficient statistics in RS.
Set CS_Temp=CS_New∪CS. Augment the set of previously computed sufficient statistics CS with the new ones surviving the filtering in steps 6 and 7.
For each set of sufficient statistics s (corresponding to a sub-cluster) in CS_Temp
Determine the s', the set of sufficient statistics in CS_Temp corresponding to the nearest subcluster to the subcluster represented by s.
If the subdluster formed by merging s and s', denoted by merge(s, s') is such that the maximum standard deviation along any dimension is less than β, then add merge(s, s') to CS_Temp and remove s and s' from CS_Temp.
Set CS=CS_Temp. Remove from RS all points that went into CS. (RS=RS−CS.)
Note that the function merge (s, s') simply computes the sufficient statistics for the sub-cluster summarizing the points in both s and s'.

Stopping Criteria at Step 140

The scalable Expectation Maximization analysis is stopped (rather than suspended) and a resultant model output produced when the test 140 of FIG. 4 indicates the Model is good enough. Two alternate stopping criteria (other than a scan of the entire database) are used.

A first stopping criteria defines a probability function p(x) to be the quantity $$p(x) = \sum_{l=1}^{K} \frac{M(l)}{N} (g(x|l))$$

where x is a data point or vector sampled from the database and 1) the quantity M(1) is the scalar weight for the 1th cluster, (The number of data elements from the database sampled so far represented by cluster 1) 2) N is the total number of data points or vectors sampled thus far, and 3) g(x|1) is the weighting factor of the data point for the 1th cluster. This weighting factor is determined from the SUM and SUMSQ and M(1) data for a given cluster as outlined previously.

Now define a function f(iter) that changes with each iteration.

$$f(\text{iter}) = \frac{1}{M} \sum_{i=1}^{M} \log p(x_i)$$

The summation in the function is over all data points and therefore includes the subclusters in the data structure CS, the summarized data in DS and individual data points in RS. When the values of $p(x_i)$ are calculated, the probablity function of a subcluster is determined by calculating the weighting factor in a manner similar to the calculation at step 232. Similarly the weighting factor for the k elements of DS are calculated in a manner similar to the step 252 in FIG. 8B. Consider two computations during two successive processing loops of the FIG. 4 scalable EM analysis. Designate the calculations for these two iterations as $f_z$ and $f_{z-1}$.

Then a difference parameter $d_z = f_z - f_{z-1}$. Evaluate the maximum difference parameter over the last r iterations and if no difference exceeds a stopping tolerance ST then the first stopping criteria has been satisfied and the model is output.

A second stopping criteria is the same as the stopping criteria outlined earlier for the extended EM procedure 120. Each time the Model is updated K cluster means and covariance matrices are determined. The two variables CV_dist and mean_dist are initialized. For each cluster k the newly determined covariance matrix and mean are compared with a previous iteration for these paramaters. A distance from the old mean and the new mean as well as a distance between the the new and old covariance matrices is determined. These values are totaled for all the clusters:

```
For 1 = 1, . . . ,k
[New_Mean, New_CVMatrix] = ConvertSuffStats(
New_Model(1).SUM, New_model(1).SUMSQ,
New_Model(1).M_1);
    mean_dist = mean_dist +
distance(Old_SuffStats(1).Mean,New_mean);
CVDist = CV_dist + distance(Old_SuffStats(1).CVMatrix,
New_CVMatrix);
End for
```

The stopping criteria determines whether the sum of these two numbers is less than a stopping criteria value:

$$((1/(2*k))*\text{mean\_dist} + \text{CV\_dist}) < \text{stop\_tol}$$

Multiple Model Embodiment

Figure 2:
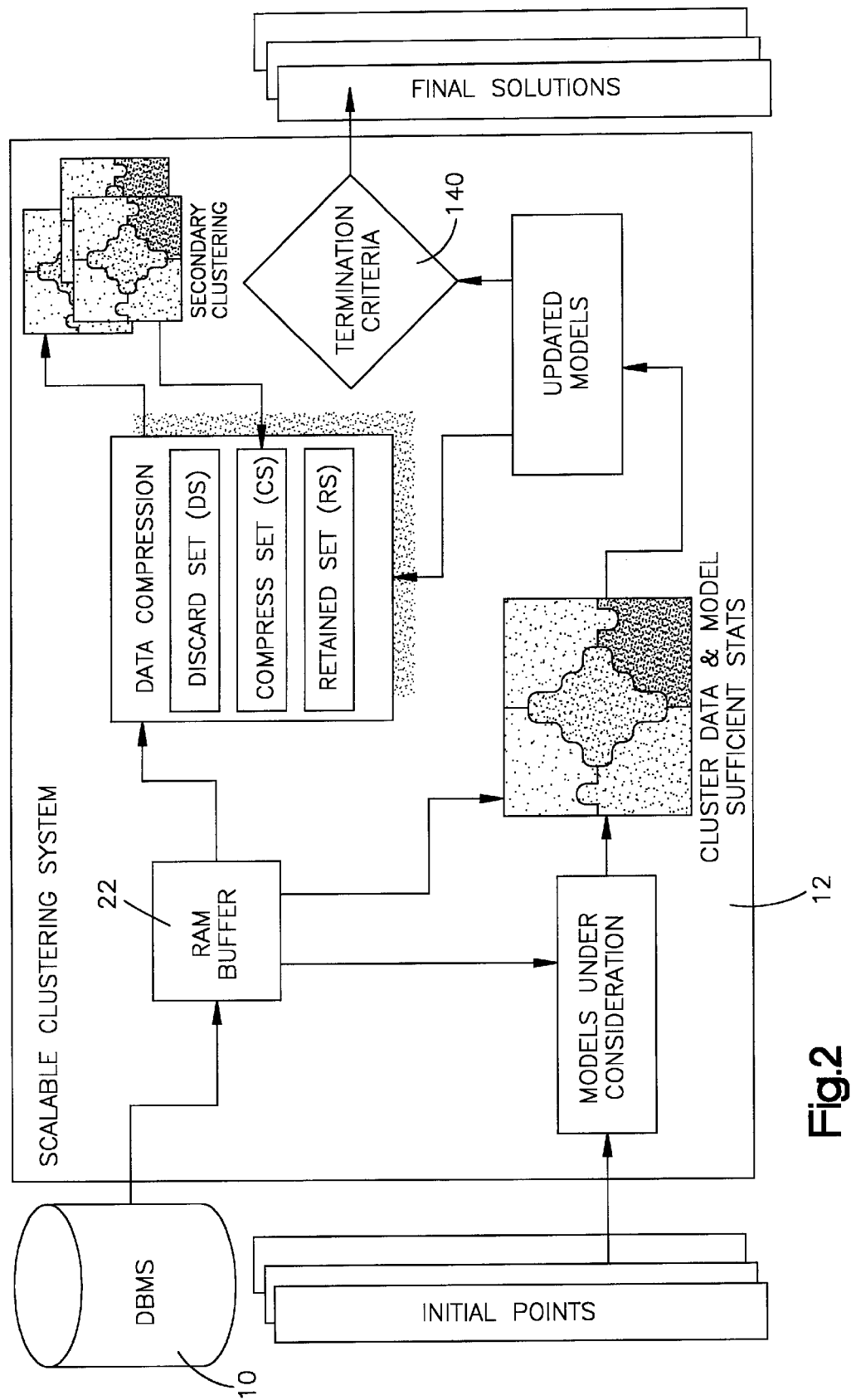
FIG. 2 is schematic depiction of a scalable clustering system.
Figure 10:
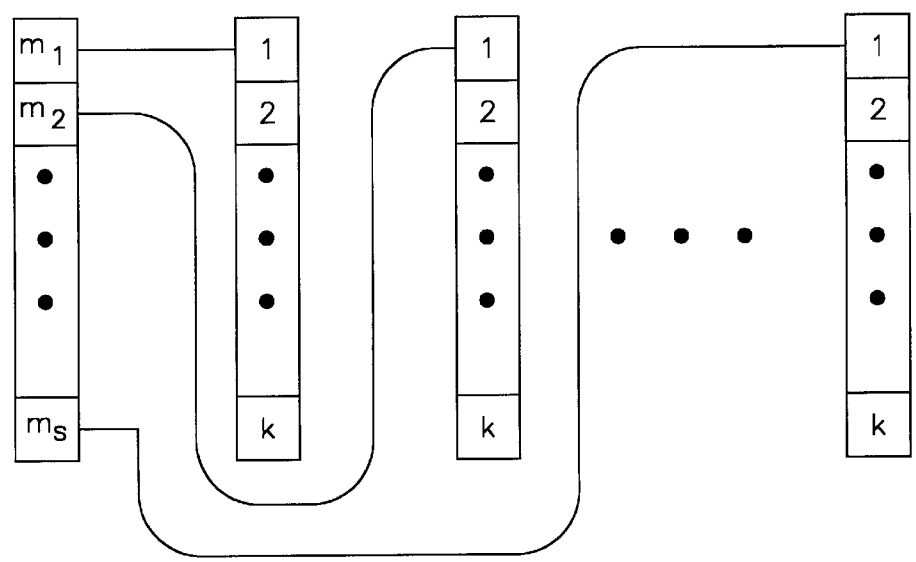
FIG. 10 is a data structure for a multiple model embodiment of the present invention.
Figure 11:
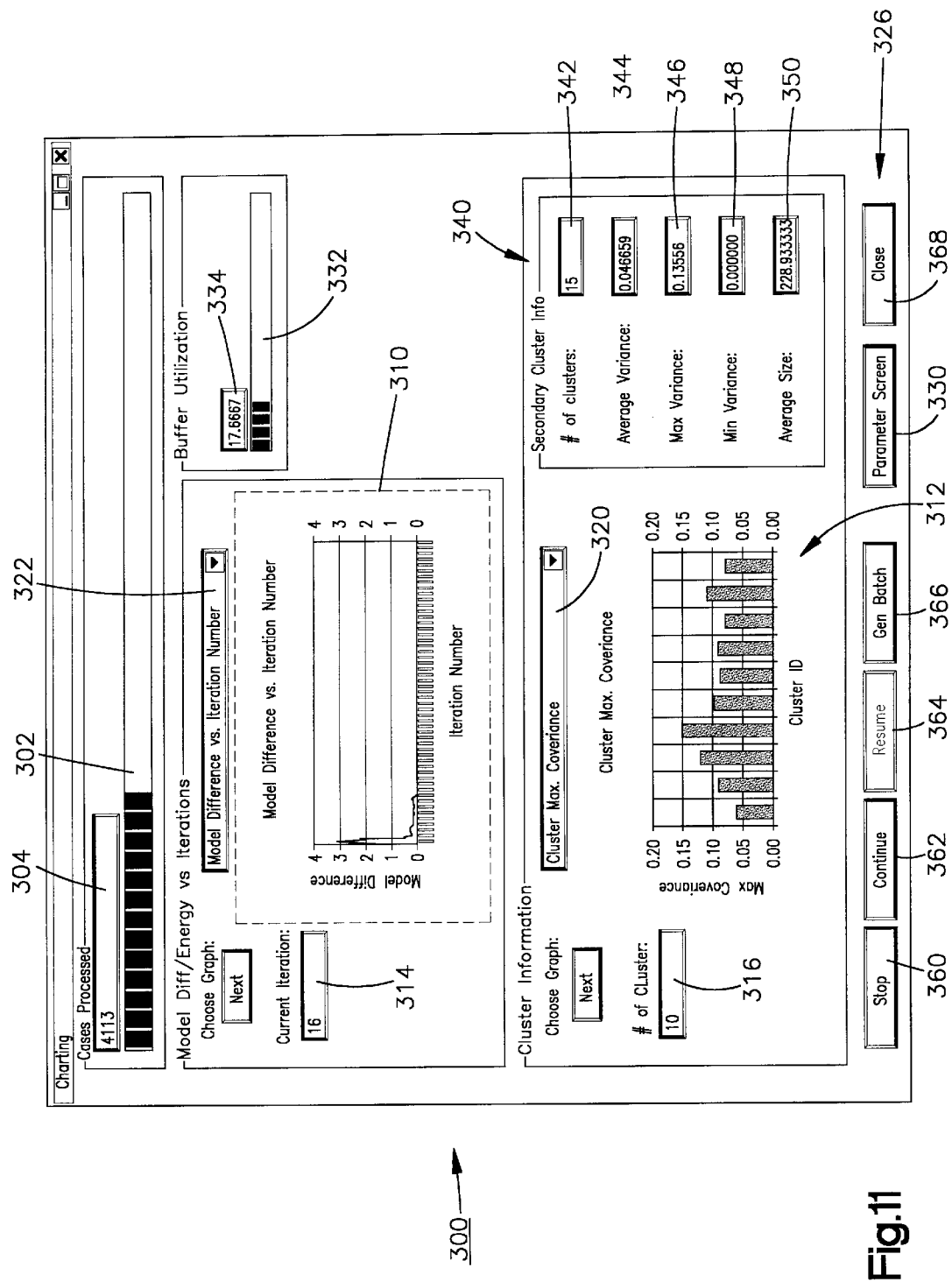
FIG. 11 is a depiction of a user interface for monitoring progress of a scalable clustering practiced in accordance with the invention.

In accordance with an alternate embodiment of the present invention, the process of FIG. 4 is supplemented with a model optimizer. In accordance with this embodiment, and as depicted in FIG. 2, a multiple number of different clustering models S are simultaneously generated by the computer 20. In FIG. 10 one sees that the multiple model embodiment is implemented with an array S of pointers $m_1 \ldots m_s$ where each pointer points to a different model data structure. The model data structure is depicted in FIG. 6D. In this embodiment the structure CS and RS are shared by the multiple models.

Each of the models $m_s$ is initialized with a different set of centroid vectors (value of 'sum', M=1) for the K different clusters of the model. When data is gathered at the step 110, that data is used to update each of the S models. An extended EM procedure for the multiple model process takes into account the multiple model aspects of the structures DS and CS that is performed on each of the S models. On a first iteration through the FIG. 4 process there is no DS or CS dataset for any of the models so that all data is in the RS dataset. A given data point $r_s$ in the data set RS is compressed into the dataset $DS_j$ for only one of the S models even though it may be close enough to a centroid to compress into a DS dataset for multiple models. The data point $r_s$ is assigned to the set DS of the model whose centroid is closest to the point $r_s$.

DS structures for all the S models are determined by compressing data points into the appropriate DS data structure. The CS data structures for each of the models are then determined from the points remaining in RS. When performing the extended EM procedure 120, however, the CS sufficient statistics must be augmented with the sufficient statistics contained in the DS data structures of the other models. When performing the extended EM procedure to update a given model mj, the subclusters in CS must be augmented with the DS structures from the other models. Specifically, when updating model $m_j$, the extended EM procedure considers the augmented set $CS_j = CS \cup DS_1 \cup DS_2 \ldots \cup DS_{j-1} \cup DS_{j+1} \cup \ldots DS_s$ when performing the loop 230 of FIG. 7. If a data point is compressed into DS, it enters the DS set of only one model at the step 240, hence there is no double counting of data.

The multiple model analysis can be performed until one of the models satisfies the stopping criteria at the step 140. An alternate system would continue to compute all the models until each model reaches a stopping criteria. Additionally, the scalable EM process could be performed until a certain percentage of the models have reached a stopping criteria. The multiple model implementation shares data structures between models and performs calculations on certain data unique to a given model. This analysis is susceptible to parallel processing on a computer 20 having multiple processing units 21.

Pseudo-Code for Multiple Model Embodiment

The following presents pseudo-code for an exemplary embodiment for the multiple-model, scalable clustering. The previous discussion makes it clear how the various embodiments can be implemented by modifying the pseudo-code below.

```
MAIN CLUSTERING LOOP:
Sub GeneralizedCluster (MODELs,ReinitEmptySeeds,StopTol,StdTol)
    DSs = {}
    Open(DataSource)
    While (True) Do {
        OldMODELs = MODELs
        SEM (MODELs,DSs,CS,RS,ReinitEmptySeeds,StopTol,StdTol)
        If TotalRowsRead < Length(DataSource) Then
            EmThreshold (MODELs,DSs,RS,Confidence)
            UpdateCS (CS,RS,StdTol)
        End If
    While Not StopCriteria (OldMODELs,MODELs,StopTol)
    Close(DataSource)
    For Each Model In MODELs Do
        Save(Model)
    Next Model
End Sub
    The Algorithm GeneralizedCluster above calls two subroutines; SEM () and
EmThreshold (). These are defined below. These two algorithms also reference other
routines which are listed here:
```

```
    [vWeight,s]   = ComputeEMWeights(Model,Mean)
    [void]        = UpdateModel(Model,SuffStat,vWeight)
    [void]        = UpdateModel(Model,DataPoint,vWeight)
    [void]        = UpdateSeedCache(SeedCache,Mean,RawScore)
    [SuffStat]    = GetBestCandidate(SeedCache)
    [void]        = UpdateCs(...)
```

UpdateCS() routine is described in copending application serial no. 09/040,219 to Fayyad et al. Which is incorporated herein by reference.

The UpdateModel() functions only differ in the second argument and have been explained previously. The procedure UpdateSeedCache() maintains a cache of candidate seeds for new clusters if the main loop at some point decides to reset one of the clusters to a new starting point (e.g. cluster goes empty). It manages a list of candidate points.

The procedure GetBestCandidate(SeedCache) returns the next candidate from the SeedCache. This criterion can be implemented in a variety of ways, but in the exemplary embodiment it returns the point that is assigned the lowest likelihood given the existing model (set of clusters). That is the point in SeedCache that has the lowest sum of heights of Gaussians from this model. This point represents a point that fits least well to the current model.

Having described all the references procedures, we now list the main algorithms:

```
Sub SEM (MODELs,DSs,CS,RS,ReinitEmptySeeds,StopTol,StdTol)
    For ModelIndex = 1 To Length(MODELS) Do
DoModelAgain:
        M              = MODELS[ModelIndex]
        RestartModel   = False
        NewSeedCache   = {}
        For Iteration  = 0 to INFINITY Do
            For each X in RS Do
                [vWeight,s] = ComputeEMWeights(M,X.mean);
                UpdateModel (Mnew,X,vWeight);
            if ReinitEmptySeeds
                UpdateSeedCache (NewSeeds,X,vWeight,s);
        Next X
        For each X in CS Do
            [vWeight,s] = ComputeEMWeights(M,X.mean);
            UpdateModel (Mnew,X,vWeight);
            if ReinitEmptySeeds
                UpdateSeedCache (NewSeeds,X,vWeight,s);
        Next X
        For each DS in DSs Do
            For each X in DS Do
                [vWeight,s] = ComputeEMWeights(M,X.mean);
                UpdateModel (Mnew,X,vWeight);
            Next X
        Next DS
        If ModelDiff(Mnew,M) < StopTol Then
            Break;
        End If
        If ReinitEmptySeeds Then
            For each Cluster in M Do
                If Cluster Is Empty
                    ResetModel = True
                End If
            Next Cluster
            If ResetModel Then
                For each Cluster in M Do
                    If Cluster Is Empty Then
                        Candidate = GetBestCandidate(NewSeedCache)
                        Cluster.Mean = Candidate.Mean
                        Candidate.Remove
                    End If
                    Cluster.Covariance = {1,1,1,...}
                Next Cluster
            End If
        End If
        M = Mnew
Next Iteration
M = Mnew
        // at this point, M has converged but it may contain centroids
        // which are duplicates of other centroids. we remove duplicate
        // centroids at this point since they simply take up space in the
        // model which could be used by viable centroid candidates.
        // We separate this check out from other post-convergence
        // since we allow for a variety of alternate embodiments
        // to implement various ways of handling this case. see code
        //below for other conditions which may arise.
        If CS Is Not Empty Then
            NewSeedCache = {}
            For each X in CS Do
                [vWeight,s] ComputeEMWeights(M,X.mean)
```

-continued

```
            UpdateSeedCache (NewSeedCache,X,vWeight,s)
        Next X
        For I = 1 to Length (M) Do
            For J = I+1 to Length(M) Do
                If Cluster M[I] is indistinguishable from Cluster M[j]
Then
                    Candidate = GetBestCandidate(NewSeedCache)
                    M[J].Mean        = Candidate.Sum
                    M[J].Covariance  = Candidate.Covariance
                    M[J].Weight      = Candidate.Weight
                    Candidate.Remove
                    RestartModel = True
                End If
            Next J
        Next I
    End If
    If RestartModel Then
        Goto DoModelAgain
    End If
    Next ModelIndex
End Sub
EmThreshold() is a scaleable clustering implementation of the third embodiment of
thresholding. Note that other embodiment implementations are described (Mahalanobis
Distance, and Worst-case perturbation), but the pseudocode is restricted to this
embodiment.
Sub EmThreshold (MODELS,DSs,RS,Confidence)
    RSDist = Array of { -1, -1, -1, +INFINITY }
    For ModelIndex = 1 To Length(MODELs) Do
        M = MODELs[ModelIndex]
        For RSIndex = 1 To Length(RS) Do
            [vWeight,S] = ComputeEMWeights(M,RS[RSIndex].Mean)
            ClusterNum = GetMaxPos(vWeights)
            If S < RSDist(ClusterNum).S Then
                RSDist[RSIndex].RSIndex     = RSIndex
                RSDist[RSIndex].ModelIndex  = ModelIndex
                RSDist[RSIndex].ClusterNum  = ClusterNum
                RSDist[RSIndex].S           = S
            End If
        Next RSIndex
    Next ModelIndex
    RSDist = Sort(RSDist,Ascending,By S)
    For I = 1 To Floor(Confidence*Length(RS)) Do
        RSIndex    = RSDist[I].RSIndex
        ModelIndex = RSDist[I].ModelIndex
        ClusterNum = RSDiSt[I].ClusterNum
        DS                     = DSs[ModelIndex]
        DS[ClusterNum].Sum     += RS[RSIndex].Mean
        DS[ClusterNum].SumSq   += RS[RSIndex].Mean*RS[RSIndex].Mean
        DS[ClusterNum].Weight ++
    Next I
End Sub
```

Computer System

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media, The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the present invention has been described with a degree of particularity, it is the intent that the invention include all modifications and alterations from the disclosed implementations falling within the spirit or scope of the appended claims.

Appendix A

The following development of the Bonferroni inequality, used to determine the multidimensional confidence interval on the mean follows from page 12 of [2] G. A. F. Seber. *Multivariate Observations.* John Wiley & Sons, New York, 1984.

A conservative procedure for determining the multidimensional confidence interval on the mean vector of a set of multivariate observations is always available using the Bonferroni inequality:

$$P\left(\bigcap_{i=1}^{r} E_i\right) \geq 1 - \sum_{i=1}^{r} P(\overline{E}_i).$$

Where $\overline{E}_i$ is the complement of $E_i$. If we use the critical level of $\alpha/r$ for each test, then $$P(E_j) = 1 - \alpha/r => P(\overline{E}_j) = \alpha/r$$

$$P\left(\bigcap_{i=1}^{r} E_i\right) \geq 1 - \sum_{i=1}^{r} P(\overline{E}_i) = 1 - r(\alpha/r) = 1 - \alpha.$$

Hence, in our application, let $E_j$ be the event that the j-th element of the l-th current mean lies in the between the values $L_j^l$ (lower bound) and $U_j^l$ (upper bound), or specifically, $L_j^l \leq \overline{x}_j^l \leq U_j^l$. Here $\overline{x}_j^l$ is the j-th element of the l-th current mean. Here the values of $L_j^l$ and $U_j^l$ define the $100(1-\alpha/r)\%$ confidence interval on $\overline{x}_j^l$ which is computed as:

$$L_j^1 = \tilde{x}_j^l - t_{(\alpha/2r),(N-1)} \cdot \sqrt{\frac{S_j^l}{N}},$$

N is the number of singleton data points represented by cluster l, including those that have already been compressed in earlier iterations and uncompressed data points. $S_j^l$ is an estimate of the variance of the l-th cluster along dimension j. Let $L^l, U^l \in R^n$ be the vectors of lower and upper bounds on the mean of cluster l.

The invention assigns data points to Gaussians in a probabalistic fashion. Two different techniques are proposed for determining the integer N, the number of singleton data points over which the Gaussian mean is computed. The first way is motivated by the EM Gaussian center update formula which is computed over all of the data processed so far (whether it has been compressed or not), hence in the first variant of the Bonferroni CI computation we take N to be the number of data elements processed by the Scalable EM algorithm so far. The second variant is motivated by the fact that although the EM Gaussian center update is over all data points, each data point is assigned probabilistically to a given Gaussian in the mixture model, hence in the second variant of the Bonferroni computations we take N to be the rounded integer of the sum of the probabilistic assignments over all data points processed so far.

The Bonferroni CI formulation assumes that the Gaussian centers, computed over multiple data samples of size N are computed as $$\frac{1}{N} \sum_{i=1}^{N} x^j$$

This is true for the classic K-means algorithm, but is only guaranteed to be true for the first iteration of the EM algorithm. Hence a distribution other than the t distribution may better fit the assumptions on the distribution of the Gaussian center as computed by the EM algorithm. This would result in a different formula for the Bonferroni CI.

After determining the confidence intervals on the K Gaussian means $L^l, U^l \in R^n, l = 1, \ldots, k$, one technique perturbs the means so that the resulting situation is a "worst case scenario" for a given singleton data element. Assuming that the data point is $x^i$, we propose solving the following optimization problem for determining the perturbed cluster means and corresponding probabilistic assignment of data point $x^i$ to the K perturbed Gaussians:

$$\min_{\tilde{x}^1, \tilde{x}^2, \ldots, \tilde{x}^k} \left\{ -\sum_{l=1}^{k} f(\tilde{x}^l) \log f(\tilde{x}^l) \middle| \sum_{l=1}^{k} f(\tilde{x}^l) = 1, L^l \leq \tilde{x}^l \leq U^l, i = 1, \cdots, k \right\}.$$

Here $f(\tilde{x}^l)$ is the probabilistic assignment of data point $x^i$ to the Gaussian centered at $\tilde{x}^l$, more specifically:

$$f(\vec{x}^i) = P(l \mid x^i) = \frac{p(x^i \mid l)P(l)}{p(x)} = \frac{p(x^i \mid l)P(l)}{\sum_{j=1}^{k} p(x^i \mid j)P(j)}, \text{ where}$$

$$p(x^i \mid l) = \frac{1}{(2\pi)^{n/2}\sqrt{|\vec{S}^l|}} \exp\left\{-\frac{1}{2}(x^i - \vec{x}^l)^T (\vec{S}^l)^{-1} (x^i - \vec{x}^l)\right\}.$$

The perturbation becomes a more general optimization problem and the procedure used in the K-mean case is a special case of the the solution of this problem when 0/1 assignments are made between points and clusters.

We claim:

1. In a computer system, a method for clustering of data records into data clusters comprising the steps of:
   a) initializing a clustering model for a plurality of data clusters by initializing a data distribution for each cluster of said plurality K of data clusters;
   b) obtaining a data portion made up of data records from a database stored on a storage medium;
   c) assigning data records from the data portion obtained from the database to the clustering model by scaling the data records with a weighting factor based upon the data distribution for each of the K clusters, and modifying the data distribution for the plurality of the data clusters in the cluster model by combining at least some of the data records from the data portion that have been scaled by a weighting factor with one or more clusters of the clustering model;
   d) summarizing at least some of the data records contained within the data portion obtained from the database based upon a compression criteria to produce sufficient statistics for data records satisfying the compression criteria; and
   e) continuing to obtain portions of data from the database and updating the clustering model based on newly sampled data records from the database and the sufficient statistics based on the contents of data records that were previously summarized until a specified clustering criteria has been satisfied.

2. The method of claim 1 wherein data portions obtained from the database are stored in a rapid access memory smaller in size than the storage requirements of the database and wherein the sufficient statistics replace data from the database in the rapid access memory to allow further data from the database to be obtained from the database.

3. The method of claim 1 wherein K weighting factors are determined for each data record based upon a relation of the data record to each cluster's data distribution.

4. The method of claim 1 wherein the data distribution for each of the K clusters is based on a co-variance matrix and a mean which are used in determining said weighting factor.

5. The method of claim 1 wherein the sufficient statistics are derived from compression of data from individual data records that satisfy a compression criteria based on the data distribution of a given cluster, of a model from a set of clusters or of a set of models each of which includes a set of clusters.

6. The method of claim 1 wherein the compression criteria selects data records stored in memory for summarization based on a weighting of each data record in relation to a data distribution implied by a cluster or a set of clusters by the steps of determining which of the multiple clusters a data record belongs to with the greatest weight and summarizing a percentage of the data records that are determined to belong to a cluster in this fashion.

7. The method of claim 1 wherein the data distribution for a cluster is based on a mean and co-variance matrix for the cluster and wherein the compression criteria identifies data records that most accurately fit a model of the cluster for compression into sufficient statistics.

8. The method of claim 1 wherein the sufficient statistics includes data organized as sub-clusters that do not satisfy the compression criteria based upon a data distribution for any of the K data clusters but wherein data records from the database for a given sub-cluster can be grouped together based upon a denseness criteria with respect to other data records obtained from the database.

9. The method of claim 1 wherein the sufficient statistics are additionally derived from creation of data sub-clusters that do not satisfy the compression criteria based upon a data distribution for any of the K data clusters but wherein data records from a given sub-cluster can be grouped together based upon a denseness criteria with respect to other data records obtained from the database.

10. The method of claim 1 wherein multiple clustering models are simultaneously generated in one or less scans of the data obtained from the database and wherein sufficient statistics for some of the data obtained from the database is shared in determining the multiple clustering models.

11. The method of claim 1 additionally comprising the step of storing a data clustering model in a rapid access portion of a computer memory wherein the clustering model includes a number of cluster model summaries and further wherein a model summary for a given cluster comprises a summation represented as a set of sufficient statistics from multiple data records that are gathered from the database.

12. The method of claim 11 additionally comprising the step of maintaining an indication of cluster spread for each dimension of the plurality of data clusters.

13. The method of claim 12 wherein the indication of spread comprises entries of a covariance matrix for the cluster.

14. The method of claim 11 wherein data records are compressed into a set of data based upon a relation of the data records to a clustering model and further includes data sub-clusters derived from data records that do not satisfy a compression criteria but which are summarized and wherein the clustering model includes a contribution of the compressed data records and the data records summarized within sub-clusters based on the data distribution of the clustering model for a given cluster.

15. The method of claim 1 wherein before the stopping criteria is reached a step is performed of choosing a new cluster characterization from a list of candidate clusters to replace one or more of the existing cluster characterization.

16. The method of claim 15 wherein the step of choosing a new cluster characterization is based upon the weighted membership of the data records in a given cluster and wherein a new characterization is chosen if said weighted membership is less than a threshold.

17. The method of claim 15 wherein the step of choosing a new cluster is performed by replacing a cluster characterization with sufficient statistics from a data subcluster from a storage region that maintains a list of such subclusters.

18. The method of claim 17 wherein the data subcluster that is chosen to replace a given subcluster is determined by summing heights of data attributes of the subcluster on clusters other than the cluster to be replaced and the subcluster having the lowest sum is the candidate subcluster that is chosen to replace the cluster.

19. The method of claim 18 wherein the cluster is replaced by sufficient statistics of a single data record in a list of individual data records and wherein the single data record is chosen based on a low sum of heights in data clusters other than the cluster to be replaced.

20. The method of claim 1 wherein the database is scanned completely and then additionally clustering is performed by rescanning the data in the database.

21. The method of claim 1 wherein the scanning of the database is random, indexed or sequential.

22. The method of claim 21 wherein the clustering is performed in less than one complete scan of the database based upon a stopping criteria.

23. The method of claim 1 additionally comprising the step of displaying parameters of a clustering process on a user interface and wherein the interface allows the user to stop and resume the clustering process.

24. The method of claim 23 additionally comprising the step of updating the database before clustering is again started.

25. The method of claim 23 wherein the user interface include controls for allowing the user to evaluate the clustering process, suspend the clustering process, adjust the number of clusters into which the data is clustered and then restart the clustering process.

26. The method of claim 23 wherein the user interface includes controls for allowing the user to save a clustering model to another storage device and then restart the clustering from the saved clustering model.

27. In a computer data mining system, apparatus for evaluating data in a database comprising:
   a) one or more data storage devices for storing a database of records on a storage medium;
   b) a computer having a rapid access memory for storing data and including an interface to the storage devices for reading data from the storage medium and bringing the data into the rapid access memory for subsequent evaluation; and
   c) said computer comprising a processing unit for clustering of at least some of the data records in the database and for characterizing the data into a clustering model having a multiple number K of data clusters wherein each data cluster is characterized by a data distribution; said processing unit programmed to retrieve data records from the database into the rapid access memory, evaluate a contribution of each record to a multiple number of data clusters based upon an existing clustering model by scaling each record with a scaling factor based on the data distribution for a data cluster, combine at least some of the data records with one or more of the K data clusters based upon said contribution, and then summarize sufficient statistics for at least some of the data records before retrieving additional data records from the database.

28. The apparatus of claim 27 wherein the computer includes a rapid access memory for storing a cluster model for each cluster, and further wherein each time data is gathered from the database the clustering model is updated and then some of the data obtained from the database is summarized into a discard set data structure associated with a given cluster based upon an updated data distribution of the multiple clusters in the clustering model and further wherein the computer forms sub-clusters of data that is summarized together for use in defining the clustering model.

29. The apparatus of claim 27 wherein the processor selects data to be compressed based on a weighting of the data point in relation to a data distribution for a cluster by the steps of determining which of the plurality of clusters a data point belongs to with the greatest weight and summarizing a percentage of the data points that are determined to belong to a cluster in this fashion as sufficient statistics to characterize a cluster that belong to with said greatest weight.

30. The apparatus of claim 27 wherein the data distribution for a given cluster is defined by a mean and a covariance matrix.

31. The apparatus of claim 30 wherein the covariance matrix has only diagonal entries.

32. The apparatus of claim 30 wherein the computer updates multiple clustering models and includes multiple processors for updating said multiple clustering models.

33. The apparatus of claim 27 wherein the processor unit processes a computer program that is part of a database data mining engine separate from an application program that requests the clustering data of a model created by the processor unit.

34. In a computer data mining system, a method for evaluating data records in a database that is stored on a storage medium comprising the steps of:
   a) initializing multiple storage areas for storing multiple cluster models of the data records in the database wherein each model is made up of multiple clusters;
   b) obtaining a portion of the data records in the database from a storage medium;
   c) using a data distribution model for clusters of the database to classify data records obtained from the database and combining at least some of the data records from the data portion to form updated multiple cluster models;
   d) summarizing data records contained within the portion of data based upon a compression criteria by comparing each data record to cluster summaries that make up the multiple cluster models to produce sufficient statistics associated with one of the multiple cluster models from each of the data records satisfying the compression criteria; and
   e) continuing to obtain portions of data from the database and characterizing the clustering of data in the database in the clustering models based on newly sampled data and the sufficient statistics for each of the multiple cluster models until a specified criteria has been satisfied.

* * * * *